United States Patent
Cobos Marquez

(10) Patent No.: US 12,537,455 B2
(45) Date of Patent: Jan. 27, 2026

(54) ELECTRICAL SWITCHED MODE POWER CONVERTER AND OPERATIVE PROCEDURE THEREOF

(71) Applicant: Differential Power, SL, Madrid (ES)

(72) Inventor: Jose Antonio Cobos Marquez, Madrid (ES)

(73) Assignee: DIFFERENTIAL POWER, SL, Madrid (ES)

(*) Notice: Subject to any disclaimer, the term of this patent is extended or adjusted under 35 U.S.C. 154(b) by 200 days.

(21) Appl. No.: 18/548,593

(22) PCT Filed: Mar. 4, 2022

(86) PCT No.: PCT/EP2022/055560
§ 371 (c)(1),
(2) Date: Sep. 1, 2023

(87) PCT Pub. No.: WO2022/184897
PCT Pub. Date: Sep. 9, 2022

(65) Prior Publication Data
US 2024/0146201 A1    May 2, 2024

(30) Foreign Application Priority Data

Mar. 4, 2021  (EP) .................................. 21382181

(51) Int. Cl.
*H02M 3/335*  (2006.01)
*H02M 1/00*   (2007.01)

(52) U.S. Cl.
CPC ..... *H02M 3/33571* (2021.05); *H02M 1/0025* (2021.05); *H02M 1/0058* (2021.05); *H02M 3/33584* (2013.01)

(58) Field of Classification Search
CPC .. H02M 1/009; H02M 1/0025; H02M 1/0058; H02M 1/008; H02M 3/33584;
(Continued)

(56) References Cited

U.S. PATENT DOCUMENTS 8,717,784 B2 *  5/2014  Park ..................... H02M 3/338
                                            363/21.02
9,263,963 B2 *  2/2016  Greenfeld ......... H02M 3/33592
(Continued)

OTHER PUBLICATIONS

European Patent Office; International Search Report and Written Opinion for PCT/EP2022/055560; Jun. 9, 2022; entire document.
(Continued)

*Primary Examiner* — Thienvu V Tran
*Assistant Examiner* — Yahveh Comas Torres
(74) *Attorney, Agent, or Firm* — Sheridan Ross P.C.

(57) ABSTRACT

An electrical switched-mode power converter (1) and a method to operate it

The power converter has some power switches, two DC ports (201, 202), in which power in each port (201, 202) may flow uni-directionally or bi-directionally, controlled by the duty cycle (d) of the power switches and including at least an inductance $L_m$ (4) whose voltage waveform alternates between a positive ($V^+$) and a negative ($V^-$) values at the switching frequency of the converter and its mean value is zero in steady state. The power converter includes an additional DC port (200) connected to said inductance $L_m$ (4), said DC port (200) with uni-directional or bi-directional power flow, comprising a controlled or un-controlled power switch (6), a second inductance $L_{s2}$ (7) operated to control the mean value of its current and an output capacitor (8) wherein the voltage of the additional DC port (200) is controlled by the switching frequency (f) of the power converter. The switching frequency and duty cycle of the power converter are controlled to provide a power flow according to three operative power pathways.

15 Claims, 24 Drawing Sheets

(58) Field of Classification Search
CPC ............... H02M 3/33507; H02M 3/01; H02M 3/33571; H02M 7/4815
See application file for complete search history.

(56) References Cited

U.S. PATENT DOCUMENTS

| | | | | |
|---|---|---|---|---|
| 9,325,249 | B2* | 4/2016 | Bucheru | H02M 3/3372 |
| 10,340,802 | B1* | 7/2019 | Ke | H02M 1/34 |
| 11,626,795 | B2* | 4/2023 | Wittenbreder, Jr. | H02M 1/0095 363/13 |
| 2007/0109822 | A1* | 5/2007 | Kuan | H02M 3/33592 363/21.14 |
| 2009/0256423 | A1* | 10/2009 | Kyono | H02M 3/33561 307/31 |
| 2010/0165673 | A1 | 7/2010 | Chang et al. | |
| 2012/0063175 | A1* | 3/2012 | Wang | H02M 3/33592 363/21.14 |
| 2014/0268902 | A1* | 9/2014 | Bucheru | H02M 1/4258 363/21.02 |
| 2020/0136521 | A1* | 4/2020 | Lin | H02M 3/33573 |

OTHER PUBLICATIONS

European Patent Office; International Preliminary Report on Patentability for PCT/EP2022/055560; Jun. 1, 2023; entire document.
Xiaofeng Sun et al.; A Novel LLC Integrated Three-Port DC-DC Conveter for Stand-Alone PV/Battery System; IEEE Conference and Expo Transportation Electrification Asia-Pacific (ITEC Asia-Pacific), IEEE, Aug. 31, 2014, pp. 1-6.
Zhijun Qian et al.; A Zero-Voltage Switching Four-Port Integrated DC/DC Converter; Telecommunications Energy Conference (INTELEC), 32nd International, IEEE, Piscataway, New Jersey, USA; Jun. 6, 2010, pp. 1-8.
Wang Fei et al.; Flyback-Based Three-Port Topologies for Electrolytic Capacitor-Less LED Drivers; IEE Transactions on Industrial Electronics, IEEE Service Center, Piscataway, New Jersey, USA; vol. 64, No. 7; Jul. 1, 2017; pp. 5818-5827.
Koki Ogura et al.; Boost Chopper-Fed ZVS-PWM DC-DC Converter With Parasitic Oscillation Surge Suppression-Based Auxiliary Edge Resonant Snubber; Intelec 2003, 25th International Telecommunications Energy Conference, Yokohama, Japan; Oct. 23, 2003; pp. 20-26.
Javier Sebastian et al.; The Double Converter: a Fully Regulated Two-Output DC-DC Converter; IEE Transactions on Power Electronics; vol. PE-2, No. 3; Jul. 1987; pp. 239-246.
Sukesh Babu Myneni; A Comparative Study of Different Control Strategies for Isolated Buck (Fly-Buck) Converter; 2018 IEEE International Conference on Power Electronics, Drives and Energy Systems (PEDES), Chennai, India, 2018; pp. 1-5.
Tsu-Min Chen et al.; Characterization of Asymmetrical Half Bridge Flyback Converter; 2022 IEEE 33rd Annual IEE Power Electronics Specialists Conference Proceedings; Cairns, QLD, Australia, 2022; pp. 921-926.
Alfredo Medina-Garcia et al.; Resonant Hybrid Flyback, a New Topology for High Density Power Adaptors; Electronics; 2018, 7, 363; pp. 1-12.
Wu Wang et al; Analysis of Fly-Buck Converter With Emphasis on Its Cross-Regulation; IET Power Electron, 2017; vol. 10, Iss.3, pp. 292-301.
Turhan et al., "Multiple-Output DC-DC Converters with a Reduced Number of Active and Passive Components," Journal of Low Power Electronics and Applications, vol. 9, No. 28, Sep. 18, 2019, 28 pages.

* cited by examiner

ELECTRICAL SWITCHED MODE POWER CONVERTER AND OPERATIVE PROCEDURE THEREOF

TECHNICAL FIELD

The present invention refers to the field of the electrical switched-mode power converters and in a more specific way to an electrical switched-mode power converter that includes two DC ports: an input port and an output port in which power in each port may flow uni-directionally or bi-directionally, controlled by the duty cycle d of some power switches of the power converter and including at least an inductance, $L_m$ whose voltage waveform alternates between a positive $V^+$ and a negative $V^-$ value at the switching frequency f of the converter and its mean value is zero in steady state.

BACKGROUND OF THE INVENTION

It is known in prior art [1] that a Switched Mode Power Supply, SMPS may regulate independently two output voltages to supply two different loads. The inductor of one output operates in Continuous Conduction Mode (CCM) and is regulated by adjusting the duty cycle of the main power switch. The inductor of the other output operates in Discontinuous Conduction Mode (DCM) and is regulated by adjusting the switching frequency of the power converter. This is known as duty cycle—switching frequency control (d-f control).

It is also known in prior art that a Buck converter, which is a 2-port power converter with a single energy source and a single load in which the output voltage is lower than the input voltage, may embed an additional secondary output attached to the inductor of the buck converter, operating in "Flyback" mode. The name in the literature for the resulting circuit is "Fly-buck converter" [2,3]. This output is typically generated to supply auxiliary circuitry of the power converter, generating an auxiliary voltage which is proportional to the main output. The additional output is not independently regulated, just the opposite. The goal is to maintain proportionality and restrain cross-regulation. In fact, the leakage inductance of the transformer is minimized to maintain proportionality. There is only one control parameter, not two. In some variations, an additional controlled switch is added in the additional output to maintain the proportionality between the outputs, by delaying the conduction of this branch.

It is also known in prior art that a half-bridge converter may be combined with a flyback converter to obtain the "Asymmetrical Half-Bridge Flyback converter", also known as "Resonant Hybrid Flyback" converter [4-5]. This circuit operates with resonant current, produced by a resonant capacitor in series with the transformer and a resonant inductor, which is located in primary side of the transformer. This leakage inductor may be the leakage inductance of the transformer in the primary winding. There is only one control parameter, used to control the output voltage of the converter. This converter is widely used in AC-DC adapters. The input capacitor is large enough to perform energy storage at line frequency (50 Hz or 60 Hz). The mean voltage of the resonant capacitor is not controlled because its voltage is the mean voltage of the voltage in the power switch, which does not change.

US2012063175 A1 discloses a circuit for use with a synchronous rectifier (SR) driver of a power converter, comprising a non-linear compensation circuit connected across the SR, wherein a voltage of the non-linear compensation circuit is outputted to the SR driver and used by the SR driver to generate a driving signal for the SR. FIG. 2B is a circuit diagram of an example of a conventional half-bridge LLC resonant converter with SRs, allowing to observe, in spite of an apparent similarity with the embodiment of FIG. 10 of this invention, that in US2012063175 A1 the resonant capacitor is not a DC port of the converter, hence its voltage cannot be controlled and the power flow is zero. Moreover, US2012063175 A1 in fact is a 2-port converter not a 3-port converter as proposed by this invention.

Document [6] discloses an electrical switched-mode power converter (see abstract and FIG. 1) including some power switches (S1, S2, S3, S4) and two DC ports (for respectively $V_{bat}$ and $V_{PV}$) in which power in each port may flow uni-directionally (for $V_{PV}$) or bi-directionally (for $V_{bat}$) since it is a stand-alone system controlled by the duty cycle ("D", see e.g. FIG. 2) of the power switches and including at least an additional inductance $L_m$, to configure an additional DC port (for $V_0$) connected to said inductance $L_m$.

However, unlike what is proposed in this invention the additional DC port (for $V_0$) is a resonant additional output, not a PWM (square voltages and triangular currents) and although $V_0$, i.e., $V_{out}$ is controlled by the switching frequency of the converter, the performance (including the gain) of a resonant converter is different from the voltage and current waveforms shown in FIG. 14.

Moreover, there is no $L_m$ in the converter between $V_{bat}$ and $V_{PV}$ since the transformer including $L_m$ and resonant network are added to the bridge $U_{tank}$. The power converter between $V_{bat}$ and $V_{PV}$ is configured as two bi-directional synchronous buck/boost with a 180° phase shift. There is no $L_m$ in this converter because there is even no transformer in the power converter between $V_{bat}$ and $V_{PV}$.

Furthermore, the voltage $U_{LM}$ in the referred $L_m$ is not square see FIG. 2 of document [6], where linear sections can be seen in the transitions from a positive to a negative value of the said voltage.

Whether in document [6] the two main ports were considered (for respectively $V_{bat}$ and $V_o$) second port, i.e., output port, includes four switches, a transformer and a rectifier, i.e., as indicated above, it is a resonant converter therefore totally different from the proposal of this invention, moreover the additional port is not connected to the transformer magnetizing inductance.

REFERENCES

[1] J. Sebastián and J. Uceda, "The double converter: A fully regulated two-output dc-to-dc converter," 1985 IEEE Power Electronics Specialists Conference, Toulouse, France, 1985, pp. 117-126, doi: 10.1109/PESC.1985.7070936.

[2] S. B. Myneni and S. Samanta, "A Comparative Study of Different Control strategies for Isolated Buck (Fly-Buck) Converter," 2018 IEEE International Conference on Power Electronics, Drives and Energy Systems (PEDES), Chennai, India, 2018, pp. 1-5, doi: 10.1109/PEDES.2018.8707754.

[3] Wu Wang et al., "Analysis of Fly-buck converter with emphasis on its cross-regulation" IET 2016, pp. 1-5, doi: 10.149/iet-pel.2016.0272

[4] Tso-Min Chen and Chern-Lin Chen, "Characterization of asymmetrical half bridge flyback converter," 2002 IEEE 33rd Annual IEEE Power Electronics Specialists Conference. Proceedings (Cat. No. 02CH37289), Cairns, QLD, Australia, 2002, pp. 921-926 vol. 2, doi: 10.1109/PSEC.2002.1022572.

[5] Medina-Garcia, A.; Schlenk, M.; Morales, D. P.; Rodriguez, N. Resonant Hybrid Flyback, a New Topology for High Density Power Adaptors. Electronics 2018, 7, 363.

[6] Xiaofeng Sun, Yanfeng Shen, Wuying Li, A novel LLC integrated three-port DC-DC converter for stand-alone PV/battery system. IEE CONFERENCE AND EXPO TRANSPORTATION ELECTRIFICATION ASIA-PACIFIC (ITEC ASIA-PACIFIC), IEE, 21 August 2014 (2014-08-31) pages 1-6, XP032671730.

BRIEF DESCRIPTION OF THE INVENTION

This invention proposes an electrical switched-mode power converter, including some power switches and two DC ports, wherein power in each port may flow uni-directionally or bi-directionally, controlled by the duty cycle d of the power switches and further including a first inductance $L_m$ whose voltage waveform alternates between a positive $V^+$ and a negative $V^-$ value at the switching frequency f of the converter and its mean value is zero in steady state all in accordance with the cited state of the art. The electrical switched-mode power converter also includes an additional DC port that is connected to the first inductance $L_m$.

In an embodiment of the invention, the voltage in the first inductance has a time interval in which the voltage is a zero-volt interval or includes a resonant transition.

This additional DC port with uni-directional or bi-directional power flow, comprises a controlled or un-controlled power switch (or second power switch), a second inductance $L_{s2}$ operating in Discontinuous Conduction Mode (DCM) and an output capacitor 8. The voltage of the additional DC port is controlled by the switching frequency f of the power converter. Optionally, the current in $L_{s2}$ may be commanded by a capacitance or an active clamp capacitance, so that the RMS value of the current flowing through the additional port is reduced, maintaining the frequency control of the output voltage. In either case, the output voltage of the port is obtained by multiplying the load resistance by the mean value of the current flowing by second inductance $L_{s2}$. In this case, the second inductance $L_{s2}$ is not operated in DCM.

In an embodiment, a capacitance and/or a clamping capacitance and a clamping switch are connected in parallel with the power terminals of the referred controlled second power switch. Such an arrangement can ensure that the conduction time of the controlled second power switch be maximized to reduce the RMS value of the current, said conduction time being adjusted to operate the controlled second power switch close to its technological limit, that is, its maximum breakdown voltage.

As per another embodiment, the electrical switched-mode power converter, further includes a third inductance $L_{s1}$.

In still another embodiment, the additional DC port further includes a transformer that provides isolation to the additional port, wherein magnetizing and leakage inductances of the transformer contribute or completely replace the first inductance $L_m$, the second inductance $L_{s2}$, and the third inductance $L_{s1}$.

In an embodiment, wherein a first of the two DC ports or the additional DC port is connected to an energy source, the energy source being a DC voltage or a low frequency AC voltage with regard to the switching frequency f of the PWM electrical switched-mode power converter; a load being connected to each of a second of the two DC ports and the additional DC port and their voltages being independently controlled by the duty cycle d and the switching frequency f of the PWM electrical switched-mode power converter.

In another embodiment, a first of the two DC ports is connected to a first energy source and the additional DC port is connected to a second energy source, the first and second energy sources being either a DC voltage or a low frequency AC voltage with regard to the switching frequency f, and a load being connected to a second of the two DC ports, the load being configured to receive power from the first and second energy sources, the power being independently controlled by the duty cycle d and the switching frequency f of the PWM electrical switched-mode power converter.

Still in another embodiment, wherein a first of the two DC ports is connected to an energy source, the energy source being a DC voltage or a low frequency AC voltage with regard to the switching frequency f, a second of the two DC ports is configured to be used as energy storage providing a two-port energy buffered power converter storing energy changes at a rate controlled either by a selected duty cycle d or by a selected switching frequency f of the PWM electrical switched-mode power converter, and the additional DC port is connected to a load, a voltage of the load being regulated by a non-selected duty cycle d or by a non-selected switching frequency f of the PWM electrical switched-mode power converter.

With regard to the duty cycle d and the switching frequency f these are configured to control the DC voltage of the load and to shape the input current in the AC or rectified AC port, whereby reducing the harmonic content of the input current waveform.

In an embodiment, the converter is based on a synchronous buck converter, wherein a first of the two DC ports is connected to an AC voltage through a rectifier bridge, and the additional DC port is connected to a load; the duty cycle d being configured to control a shape of an input current, and an amplitude of the input current being adjusted by regulating a mean voltage of a second of the two DC ports, which is connected to an energy storage; a voltage applied to the load being regulated by the switching frequency f.

As per another embodiment, the additional DC port is connected to an AC voltage, a first of the two DC ports is configured to be used as an energy storage, and a second of the two DC ports is connected to a load, the controlled second power switch being bi-directional, the switching frequency f being configured to control a shape of an input current, an amplitude of the input current being adjusted by regulating a mean voltage of the first of the two DC ports used as energy storage, and a voltage applied to the load being regulated by the duty cycle d.

The invention also refers to a method to operate an electrical switched-mode power converter 1, with the improvements as described up to this point, wherein the switching frequency f and duty cycle d are controlled to provide a power flow according to three operative power pathways:

A. from AC input port the power flows to the load port and to the energy storage port; this mode applies for AC input voltage higher than a given threshold;

B. from AC input port and the Energy storage port the power flows to a load port; this mode applies when the input power is lower than the power demanded by the load; and C. from the energy storage port the power flows to a load port; this mode applies for AC input voltage lower than a given threshold.

Moreover, as per the proposed method, the mean voltage in the energy storage port is adjusted according to the RMS or peak voltage of the AC port, hence reducing power losses and improving power converter performance.

In addition to the above, transitions between exposed modes and operation of the electrical switched-mode power converter are made according to the following patterns:

from mode A to B and from B to A, these two transitions do not require any specific action from the control circuitry; the duty cycle d controls the desired input current shape, i.e. to meet the power factor correction regulations or low frequency harmonics standards and its amplitude, to take from the input the same power as the power delivered to the output; the latter is achieved by controlling the mean value of the voltage in the energy storage port; the switching frequency f controls the output voltage in the additional port;

from mode B to C, the time instant at which the transition occurs is when $V_2-V_1<V_{threshold\_BC}$; from that moment on, the AC input port does not supply nor drains any power; its function is just to demagnetize the first inductance $L_m$; the voltage in the AC input port is adjusted by the duty cycle d of the converter, $D_{idle}$, which may be selected to optimize the performance of the converter, i.e., the efficiency; and from mode C to B, the time at which the transition occurs is when $v_2-v_1>V_{threshold\_CB}$; from that moment on, the AC input port supplies power again; the duty cycle d of the converter is controlled to adjust the shape and amplitude of the input current, as in mode A.

BRIEF DESCRIPTION OF THE FIGURES

In FIG. 14B there is no capacitance 82 nor active clamp 62, 92 in any of the power switches 5,6

In FIG. 14C there is active clamp 61, 91 62, 92 in all the power switches 5,6 for a voltage in the DC port 201 equal to the output voltage in the DC port 200 in this equivalent circuit In FIG. 14D there is active clamp 61, 91 62, 92 in all the power switches 5,6 for a voltage in the DC port 201 higher than the output voltage in the DC port 200 in this equivalent circuit In FIG. 14E there is active clamp 61, 91 in the power switch 5, and a capacitance 82 in the power switch 6 of the additional DC port, for a voltage in the DC port 201 lower than the output voltage in the DC port 200 in this equivalent circuit In FIG. 14F there is no capacitance 82 nor active clamp 62, 92 in any of the power switches 5,6. The output capacitance of any of the DC ports 201, 202 is a magnitude enough to produce a voltage resonance added to its mean voltage that produces a resonance in the current in the second inductance $L_{s2}$ (7).

A. from AC input port (Port 202) the power flows to the load port (Port 200) and to the energy storage port (port 201);

B. from AC input port (Port 202) and the Energy storage port (Port 201) the power flows to the load port (Port 200); and C. from the energy storage port (Port 201) the power flows to the load port (Port 200)

Figure 15A:
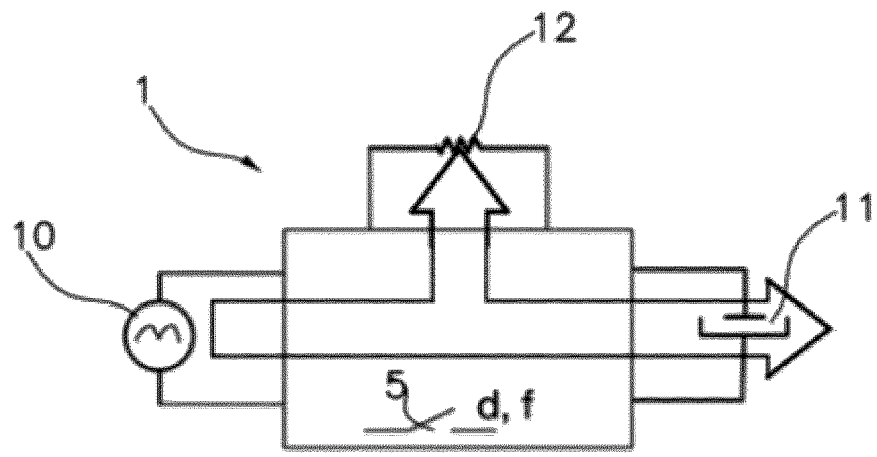
FIG. 15A to 15C show three operation modes of the switched mode power converter according to this invention using the embodiment of FIG. 9A or FIG. 10, wherein the switching frequency and duty cycle d are controlled to provide a power flow according to three operative power pathways.
Figure 15B:
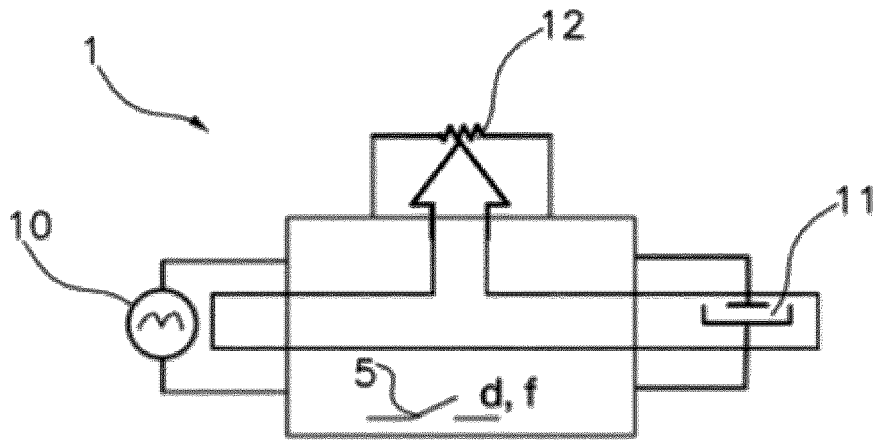
Figure 15C:
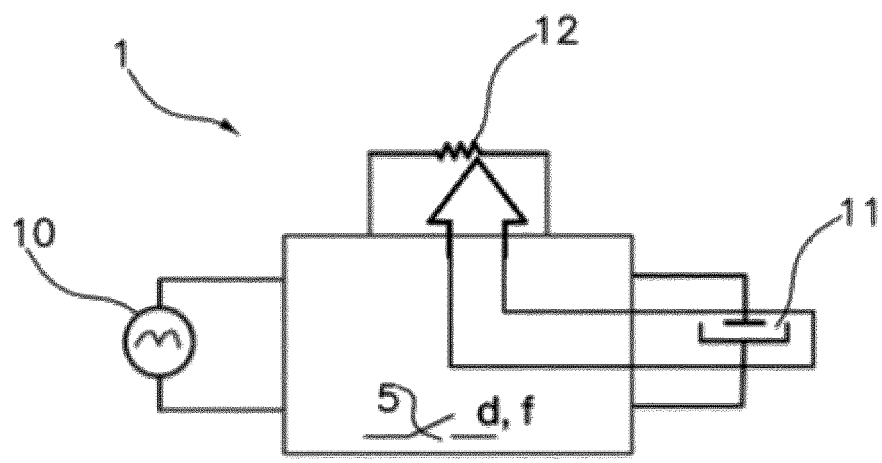
Figure 16A:
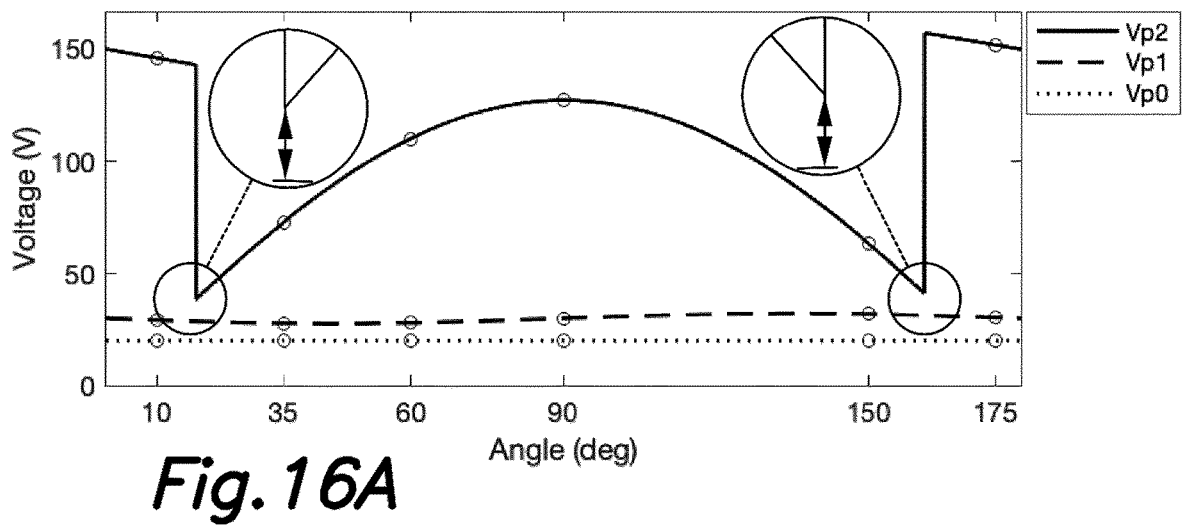
Figure 16B:
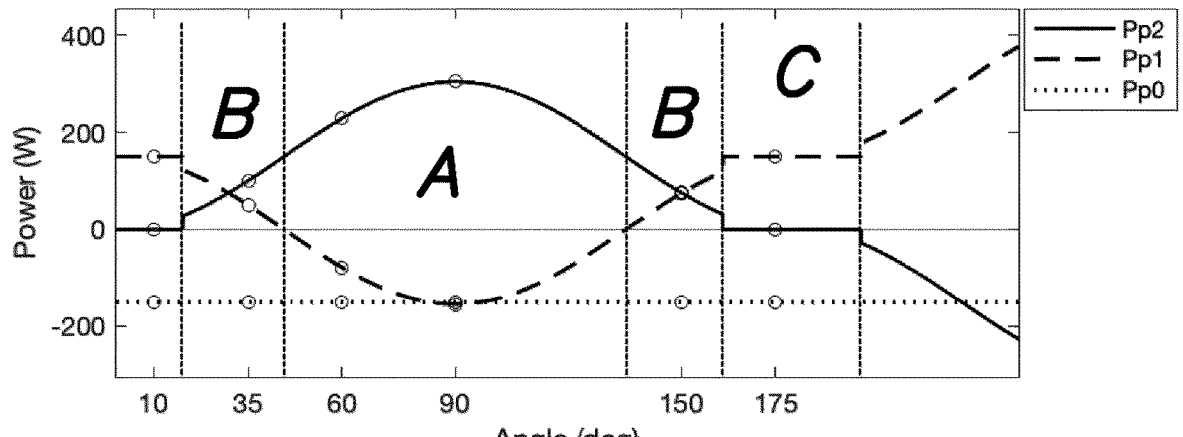
Figure 16C:
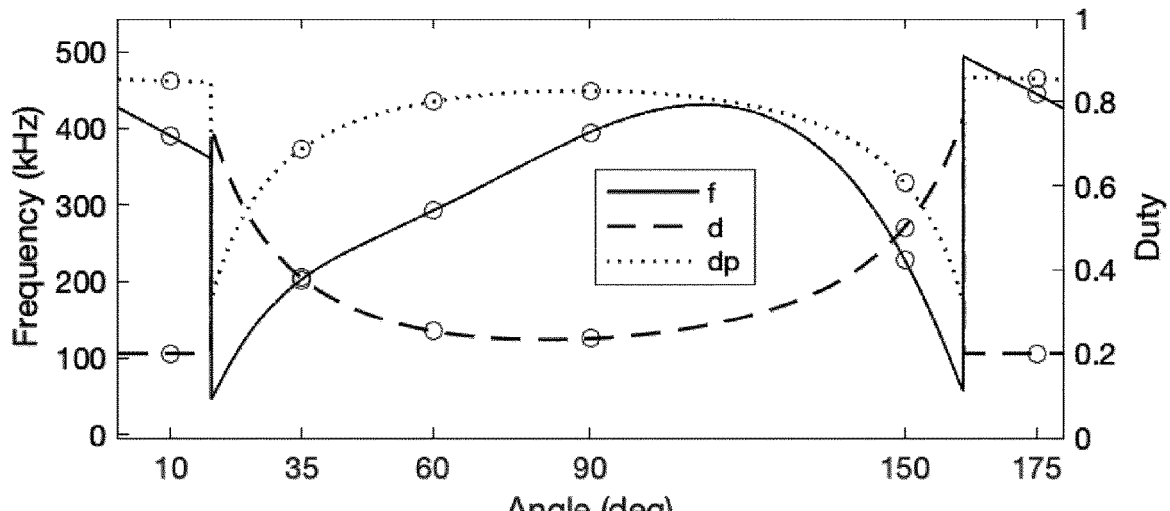
Figure 16D:
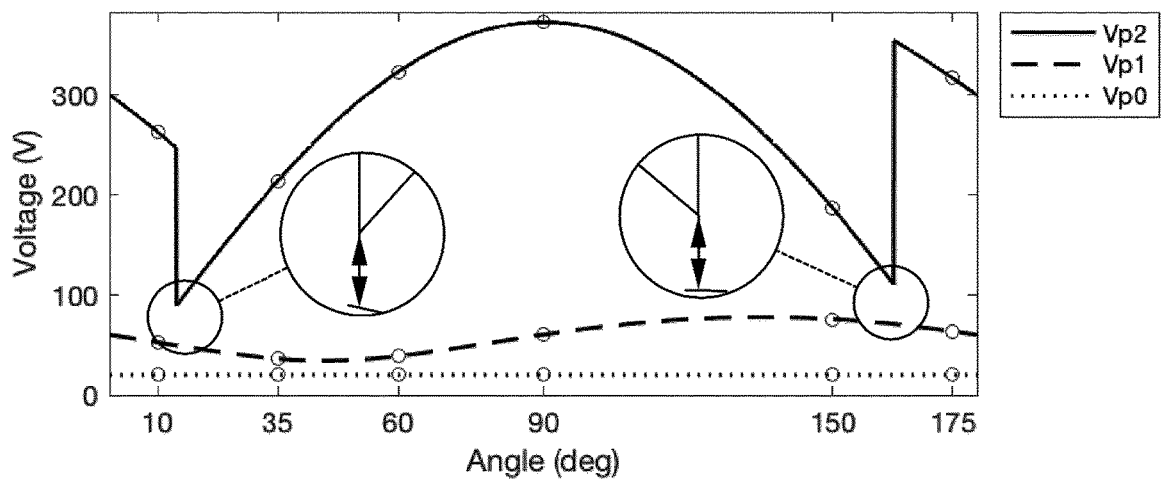
Figure 16E:
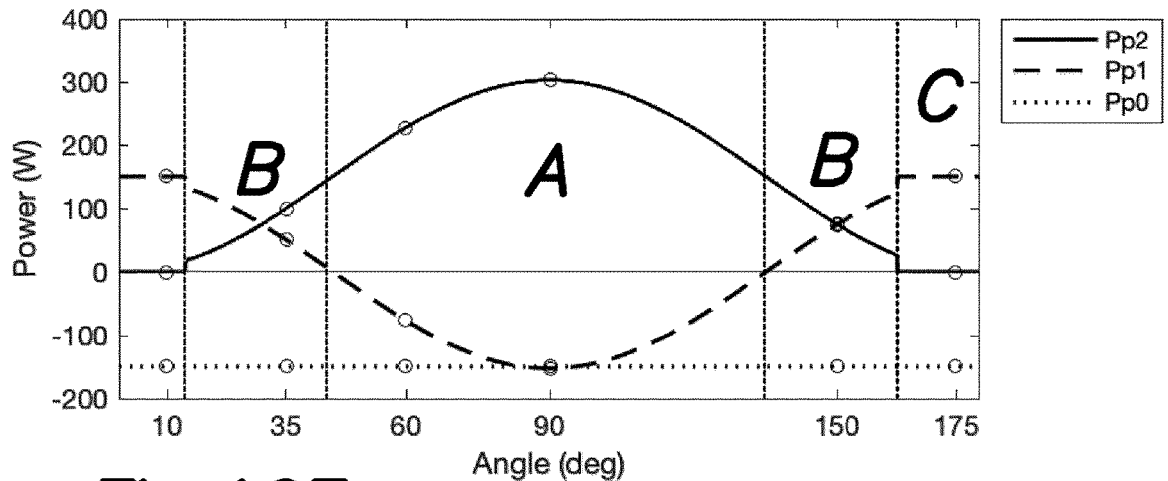
Figure 16F:
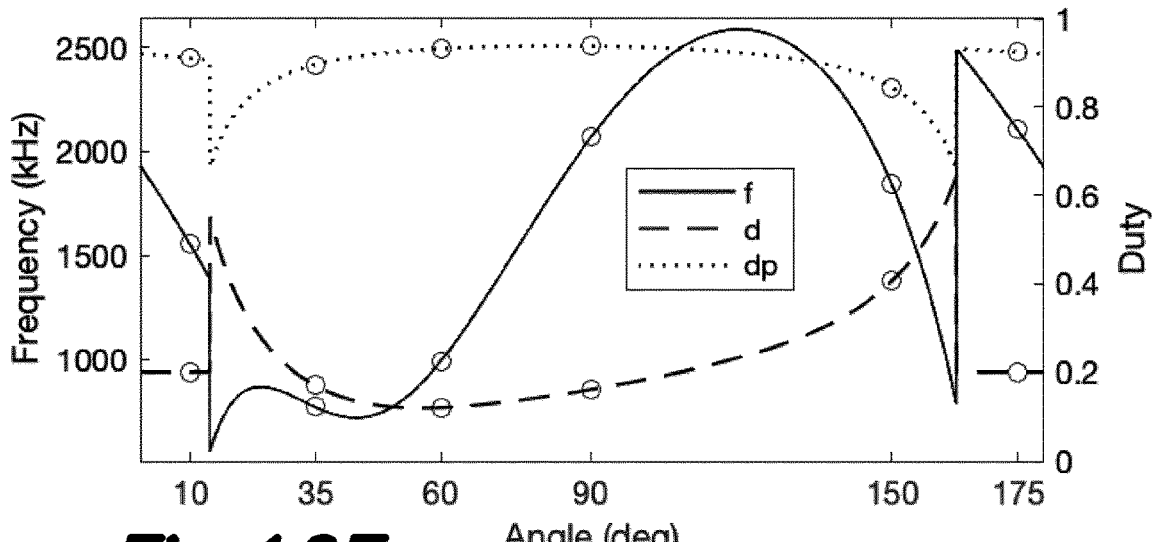
Figure 17A:
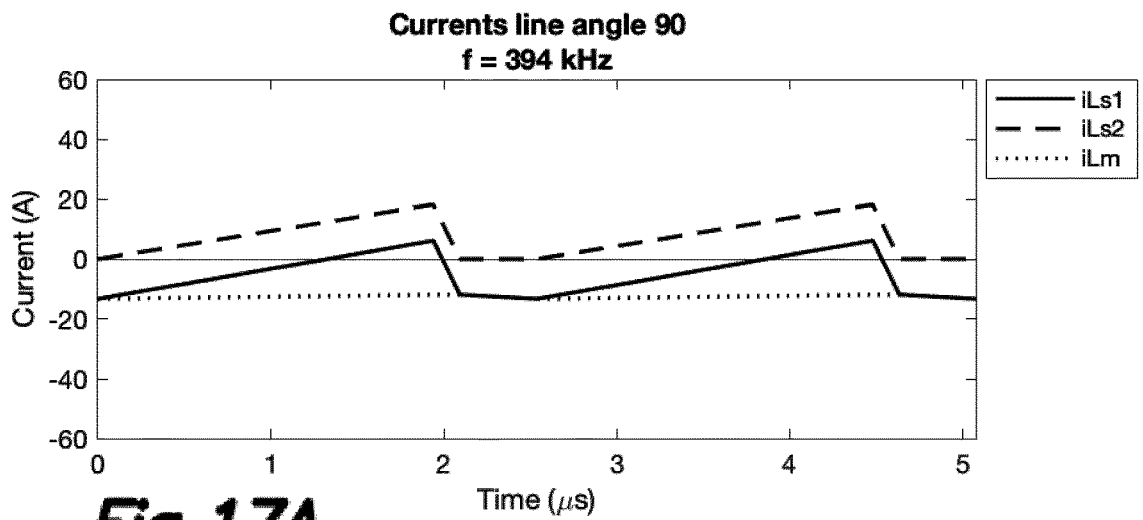
Figure 17B:
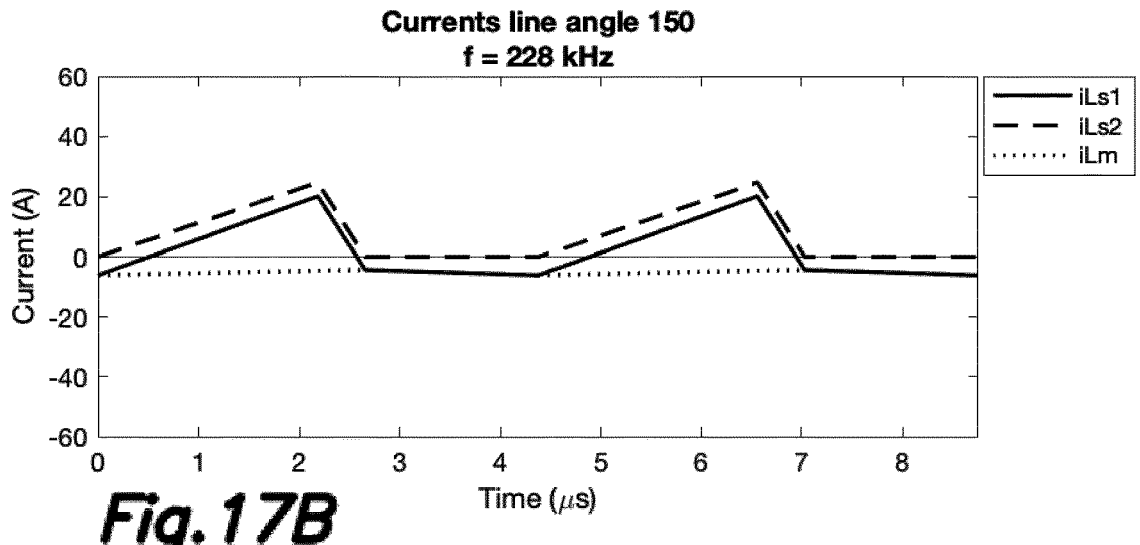
Figure 17C:
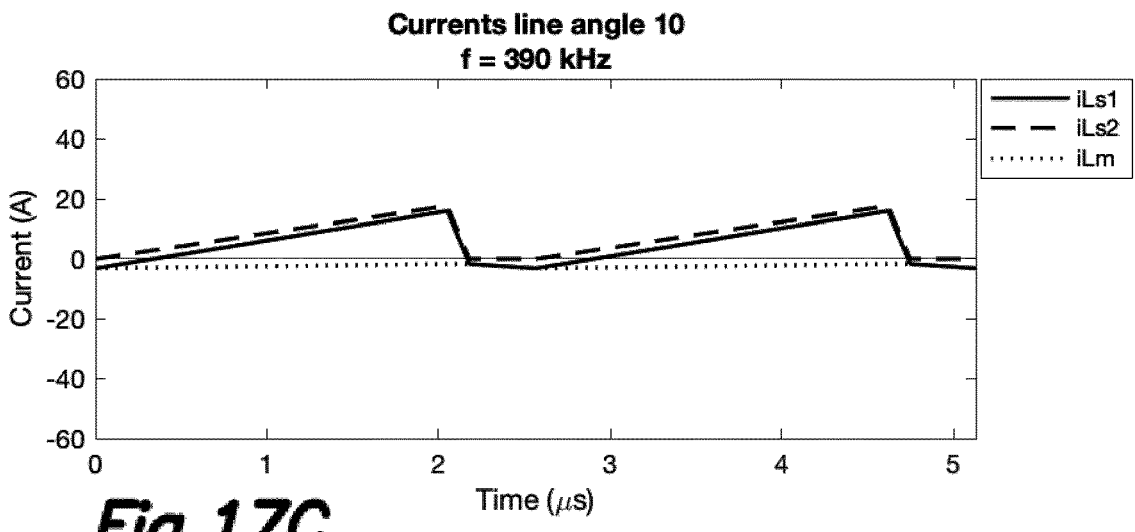
Figure 17D:
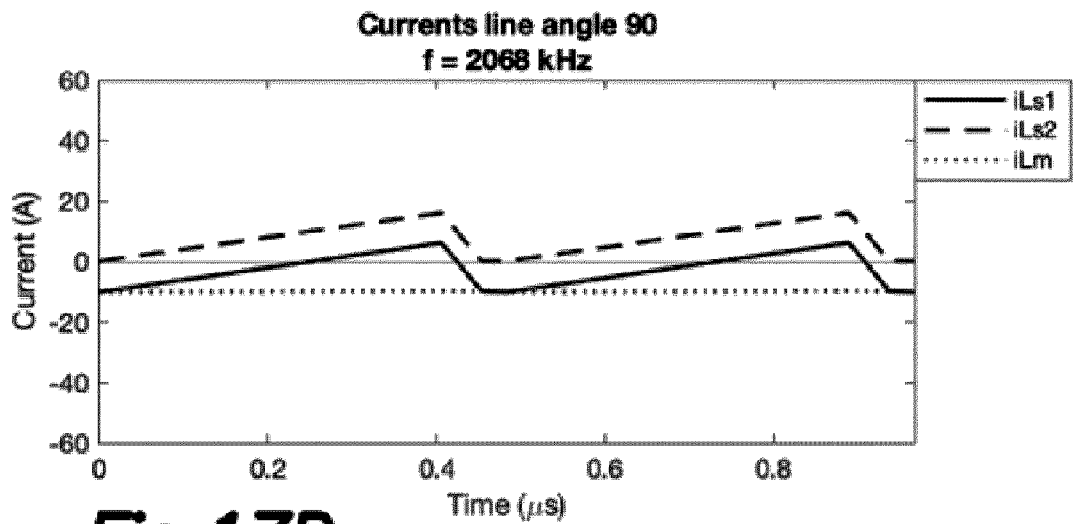
Figure 17E:
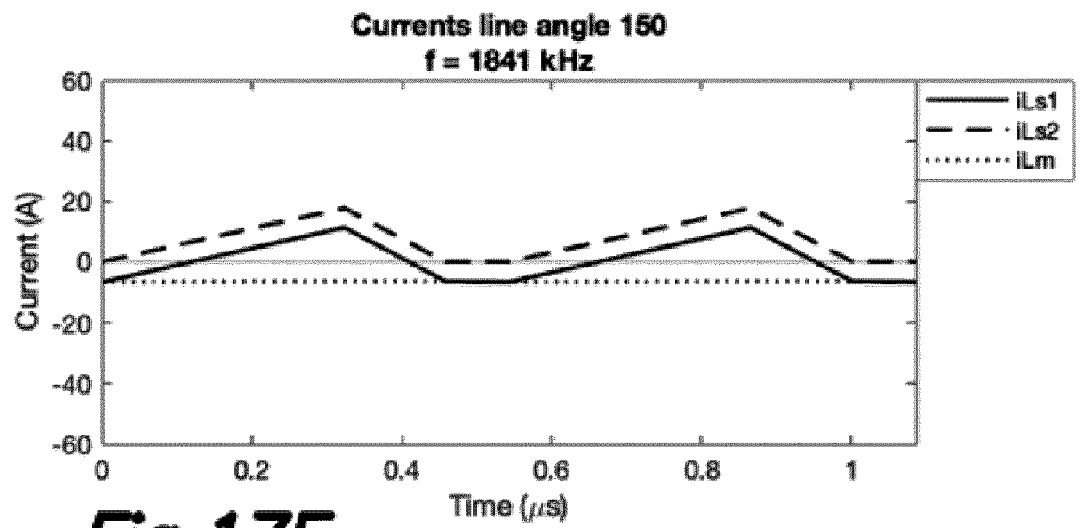
Figure 17F:
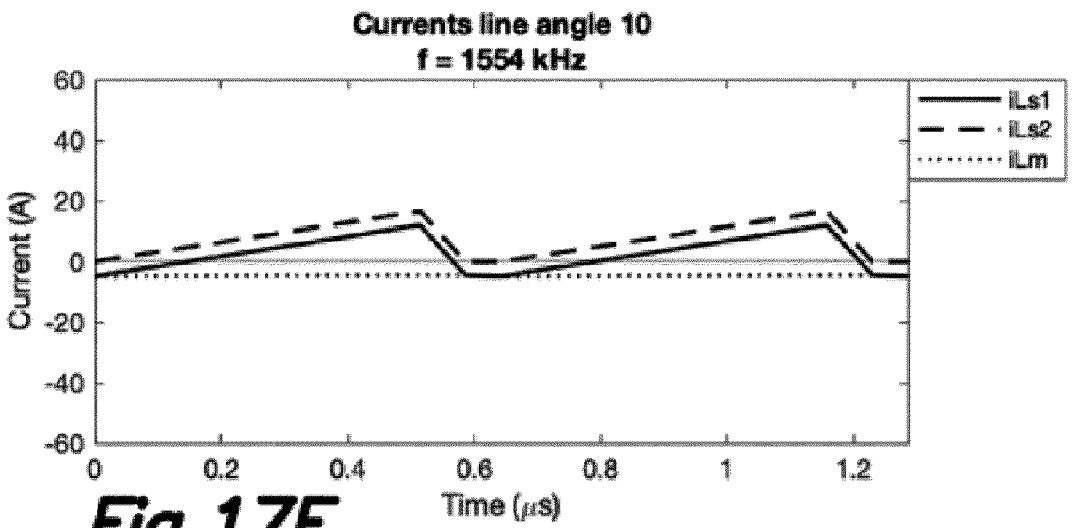

FIGS. 16A to 16F disclose the evolution of main magnitudes at line frequency illustrating the three operation modes described in FIGS. 15A to 15C for low and high AC input voltage.

Note that in operation mode "C", the voltage in the port 202 is determined by the voltage gain of the synchronous buck, and not the rectified AC voltage, as would be expected in a typical diode bridge rectifier (as per the prior art).

FIGS. 17A to 17F disclose main current waveforms in the inductances at switching frequency, for the three operation modes described in FIGS. 15A to 15C and for high and low AC input voltage.

In the FIGS. 10 to 14A a further embodiment has been detailed comprising the optional addition of a capacitance in parallel with the power terminals of the power switch 5 of the primary side of the power converter. This alternative embodiment has been indicated inside a box labelled Z' only shown in FIG. 11A. The previously indicated box Z' and Z can also be further included in any of the embodiments of FIGS. 10 to 14A while it has not been depictured.

DETAILED DESCRIPTION OF SEVERAL EMBODIMENTS

Figure 1:
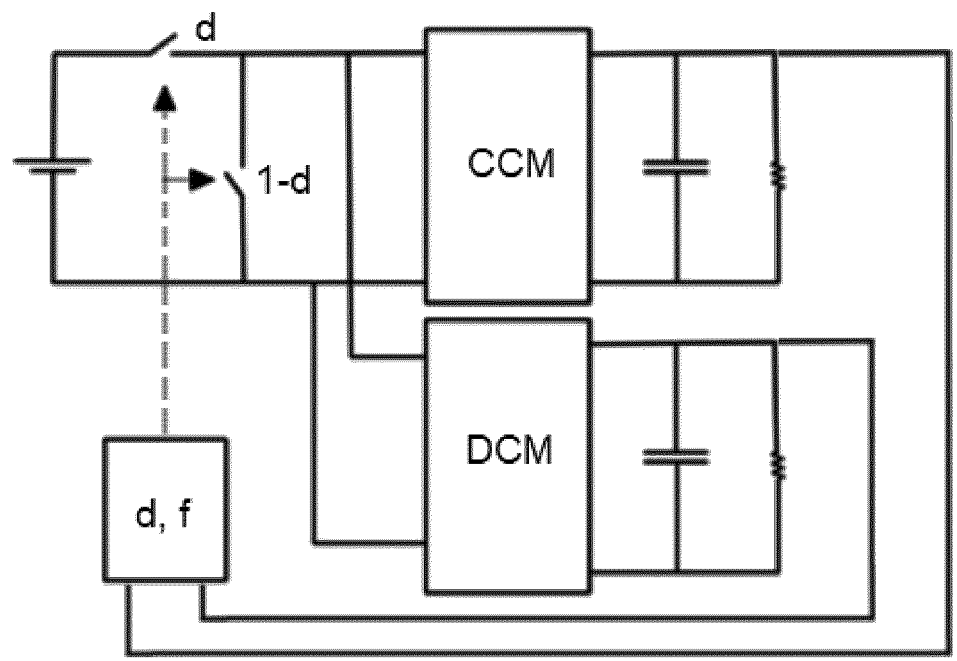
FIG. 1 shows a diagram of a switched mode power converter with two outputs, according to the state of the art in which the two outputs are independently controlled by means of the duty cycle and the switching frequency.

FIG. 1 illustrates a duty cycle d and frequency control in a power converter as it is known in the state of the art in this technical field, showing more specifically two outputs of a DC-DC switched mode power converter that can be independently regulated. The inductance of one output operates in CCM and is regulated by adjusting the duty cycle d. The inductance of the other output operates in DCM and is regulated by adjusting the switching frequency f.

Figure 2:
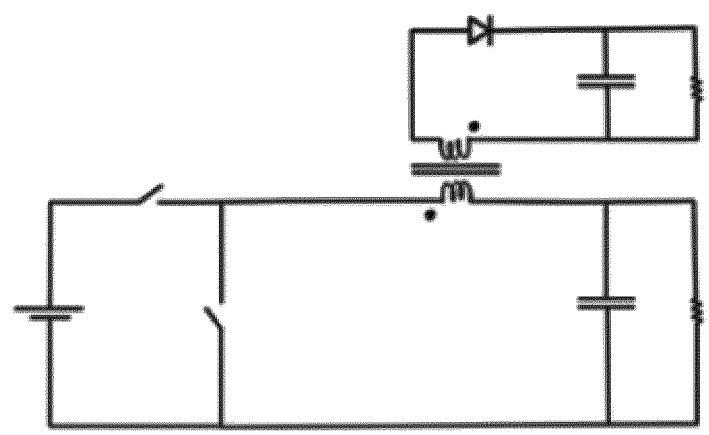
FIG. 2 illustrates a buck converter with an additional output, operating in fly-buck mode known in the previous art.

As per FIG. 2 an additional secondary output is connected to the inductance of a buck converter, described in the literature as operating in "Flyback" mode. This output is typically generated to supply auxiliary circuitry of the power converter, generating an auxiliary voltage which is proportional to the main output. The additional output is not independently regulated, just the opposite. The goal is to maintain proportionality and restrain cross-regulation. In fact, the leakage inductance of the transformer 20 is minimized, to maintain proportionality. There is only one control parameter, not two. In some variations, an additional controlled switch is added in the additional output to maintain the proportionality between the outputs, by delaying the conduction of this branch.

Figure 3:
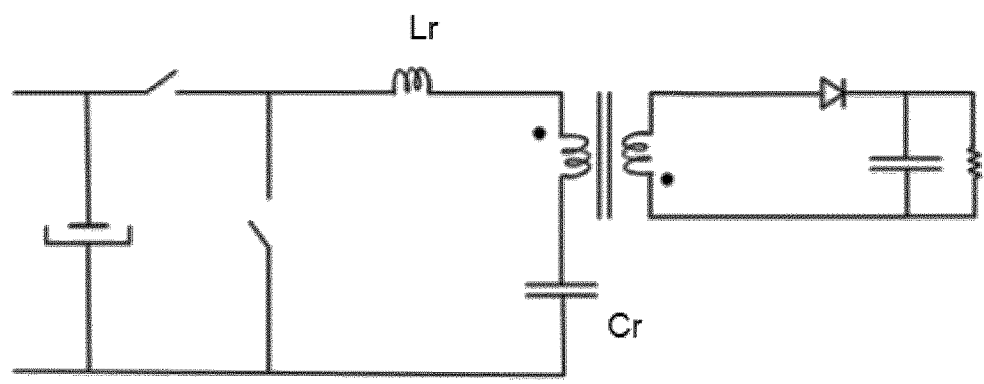
FIG. 3 discloses a known arrangement of a circuit also known in the art, which may be described as an "Hybrid Flyback" or an "Asymmetrical Resonant Half Bridge".

With reference to FIG. 3, a DC-DC converter as per an arrangement known in the art operates with resonant current, produced by a resonant capacitor in series with the transformer 20 and a resonant inductance, which is located in the primary side of the transformer 20. This resonant inductance may be the leakage inductance of the transformer 20 in the primary winding. There is only one control parameter, used to control the output voltage of the converter. This converter is widely used in AC-DC adapters. The input capacitor is large enough to perform the function of energy storage at line frequency (typically 50 Hz or 60 Hz). The mean voltage of the resonant capacitor is not controlled because its voltage is the mean voltage of the voltage in the power switch, which does not change.

Figure 4A:
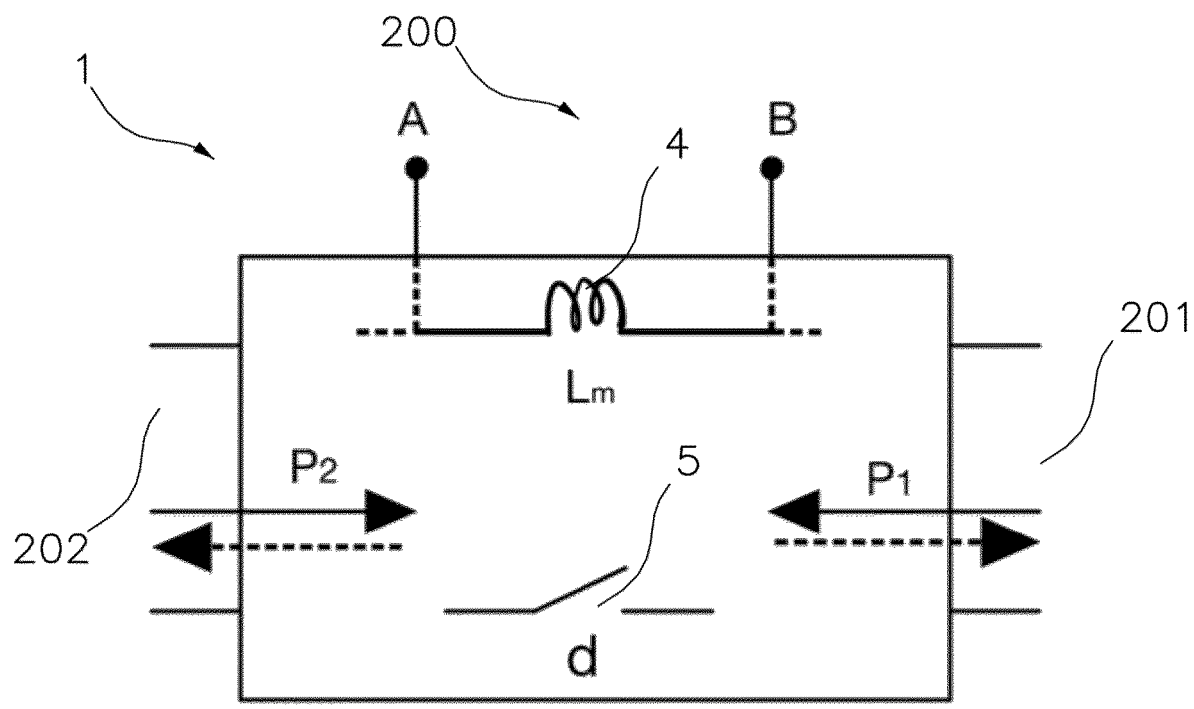
FIG. 4A illustrates an embodiment of a switched mode power converter according to this invention in which an additional DC port, that is illustrated more in detail in FIG. 4B is incorporated.

As previously disclosed, the present invention is based on a switched mode power converter that typically includes at least one inductance $L_m$, 4, to perform the power transfer (see FIG. 4a). The voltage applied to the inductance $L_m$, 4, is typically a periodic waveform with positive $V^+$ and negative $V^-$ levels. The ports 201 and 202 may be bi-directional, and the voltage gain is typically controlled in PWM converters by the duty cycle d of the main switch, at constant switching frequency f in the range of kHz or MHz. In resonant converters, the gain is controlled by adjusting the switching frequency f.

Figure 4B:
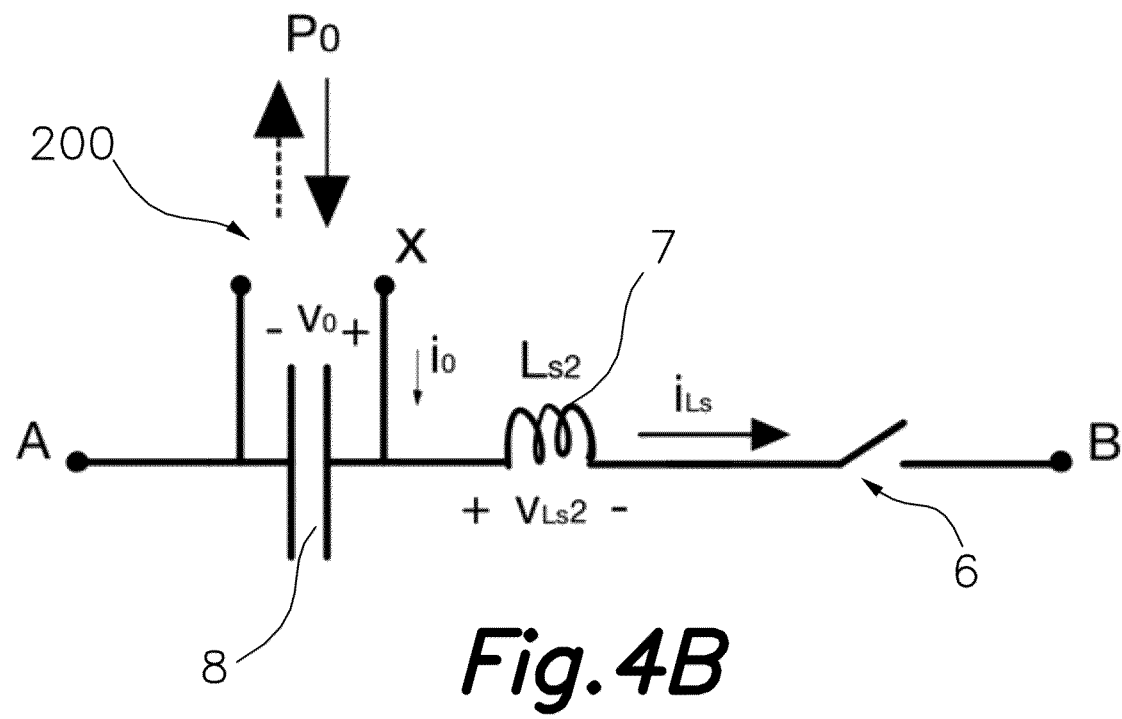
FIG. 4B shows the minimum or basic components of additional DC port to be added to the embodiment of FIG. 4A including a controlled or uncontrolled power switch and a second inductance. The second inductance is operated to control the mean value of its current. The controlled or uncontrolled power switch may be unidirectional or bi-directional.
Figure 4C:
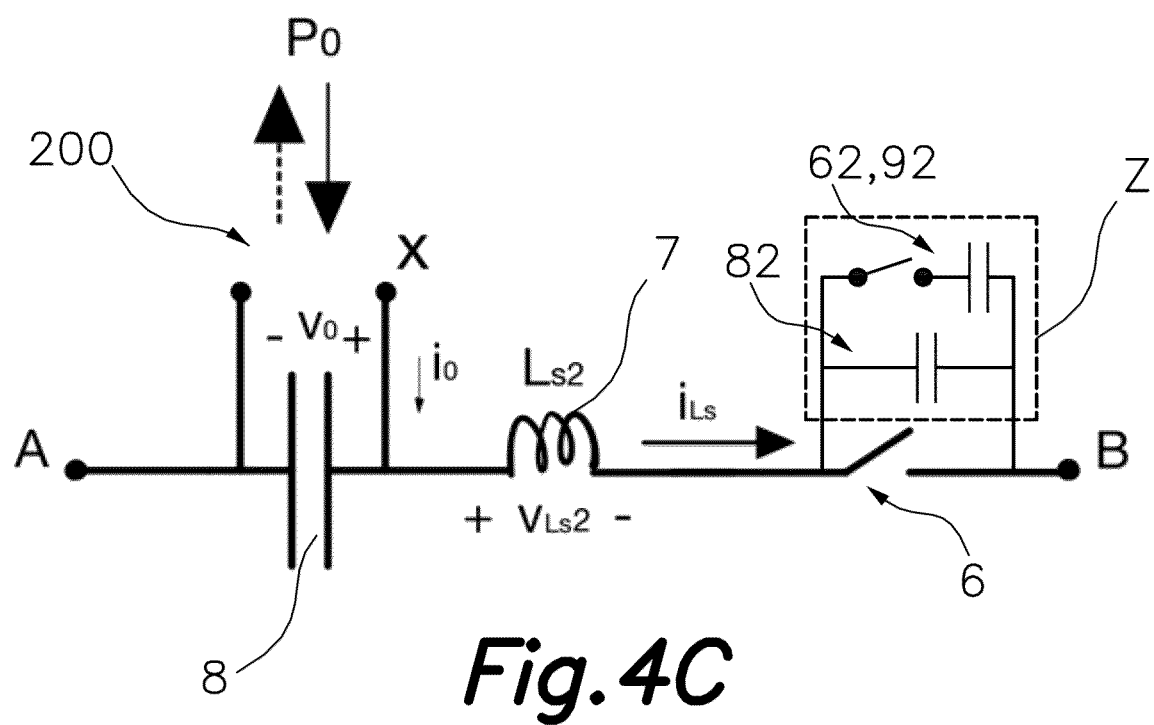
FIG. 4C is equivalent to FIG. 4B but showing the cited alternative embodiment further including a capacitance 82 connected in parallel and/or a clamping capacitance 92 and a clamping switch 62 connected in parallel with the power terminals of the controlled or uncontrolled power switch of the additional DC port. The cited capacitance and/or clamping capacitance and clamping switch which are optional have been included inside a box in a dotted line labeled Z.
Figure 4D:
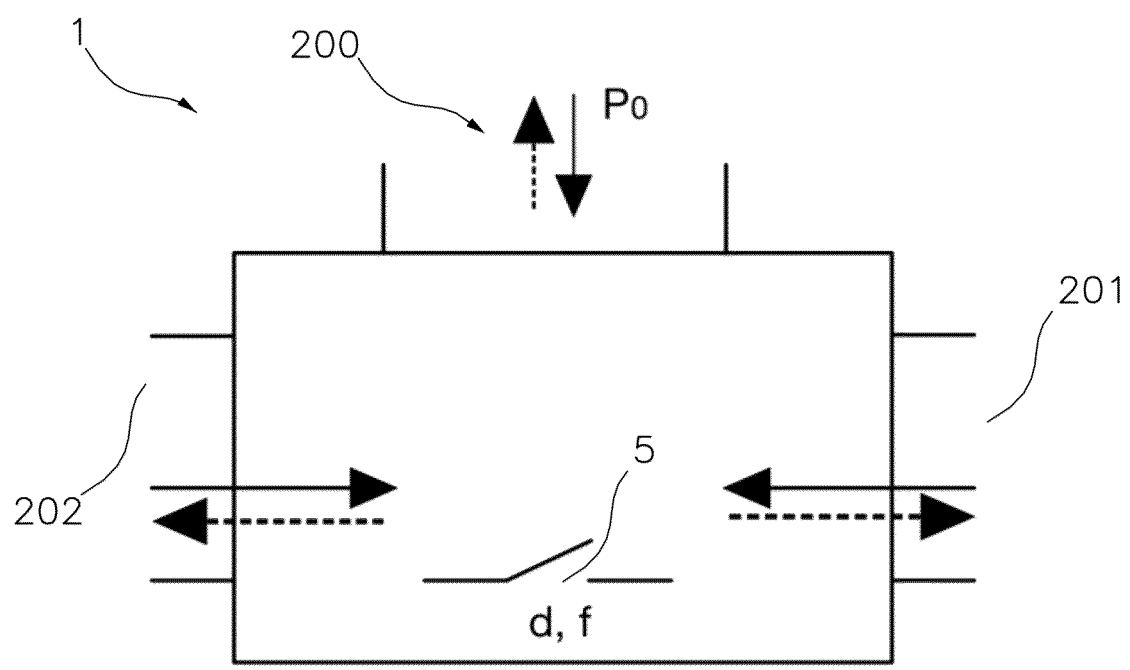
FIG. 4D schematically shows the result of the incorporation of the additional port providing this invention.

As previously indicated in the embodiment of FIG. 4b, an additional port 200 is added. The additional port 200 includes a controlled second power switch 6 and a second inductance $L_{s2}$ 7 operating in Discontinuous Conduction Mode (DCM) and an output capacitor (8). The inductance $L_{s2}$ 7 operates in DCM and the controlled second power switch 6 may be unidirectional or bi-directional. The result is depictured in FIG. 4C showing a multi-port DC-DC converter. The power flow in the ports may be uni-directional or bi-directional. The voltage in the additional port 200 is adjusted by the switching frequency f. For reference, the nomenclature of the ports is such that $V_2 > V_1$.

Figure 5:
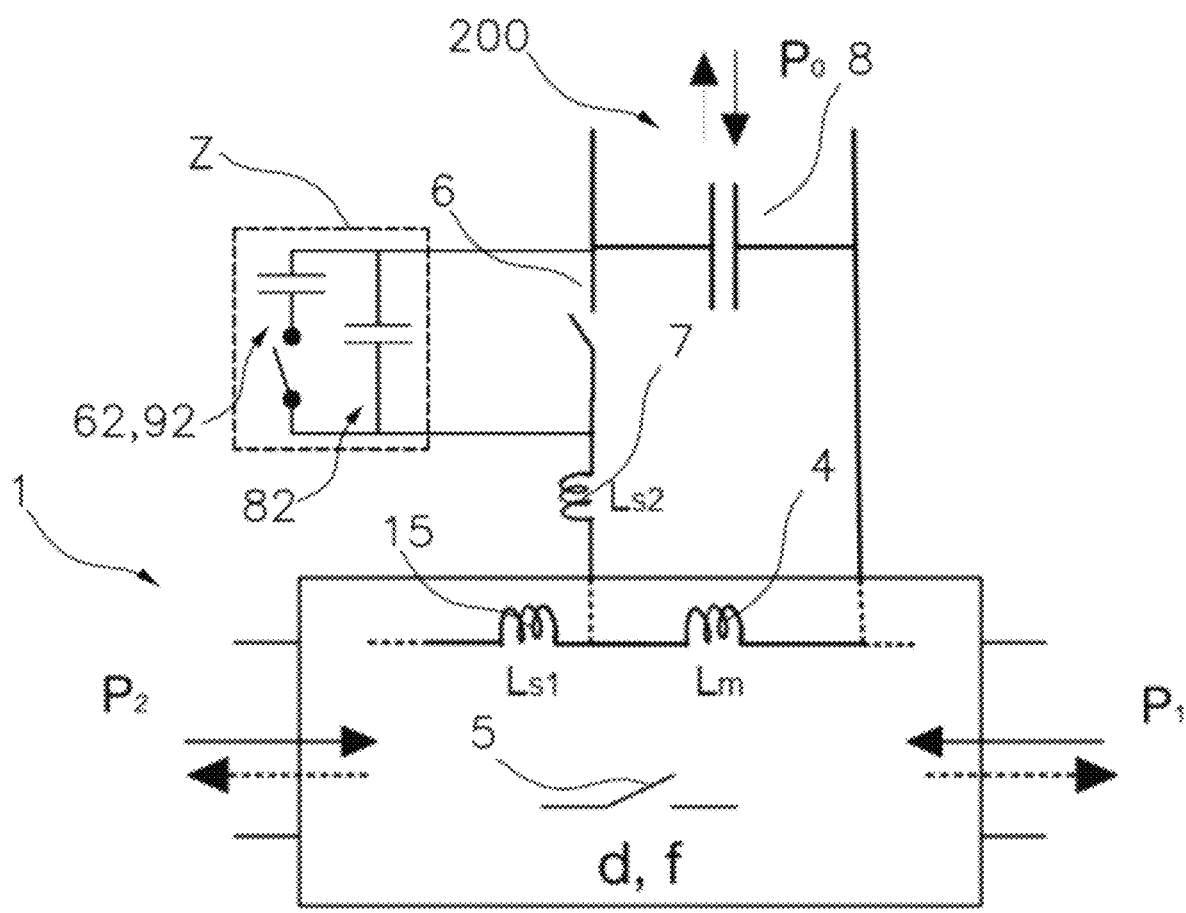
FIG. 5 illustrates another embodiment of this invention with the addition of the inductance $L_{s1}$.
Figure 6A:
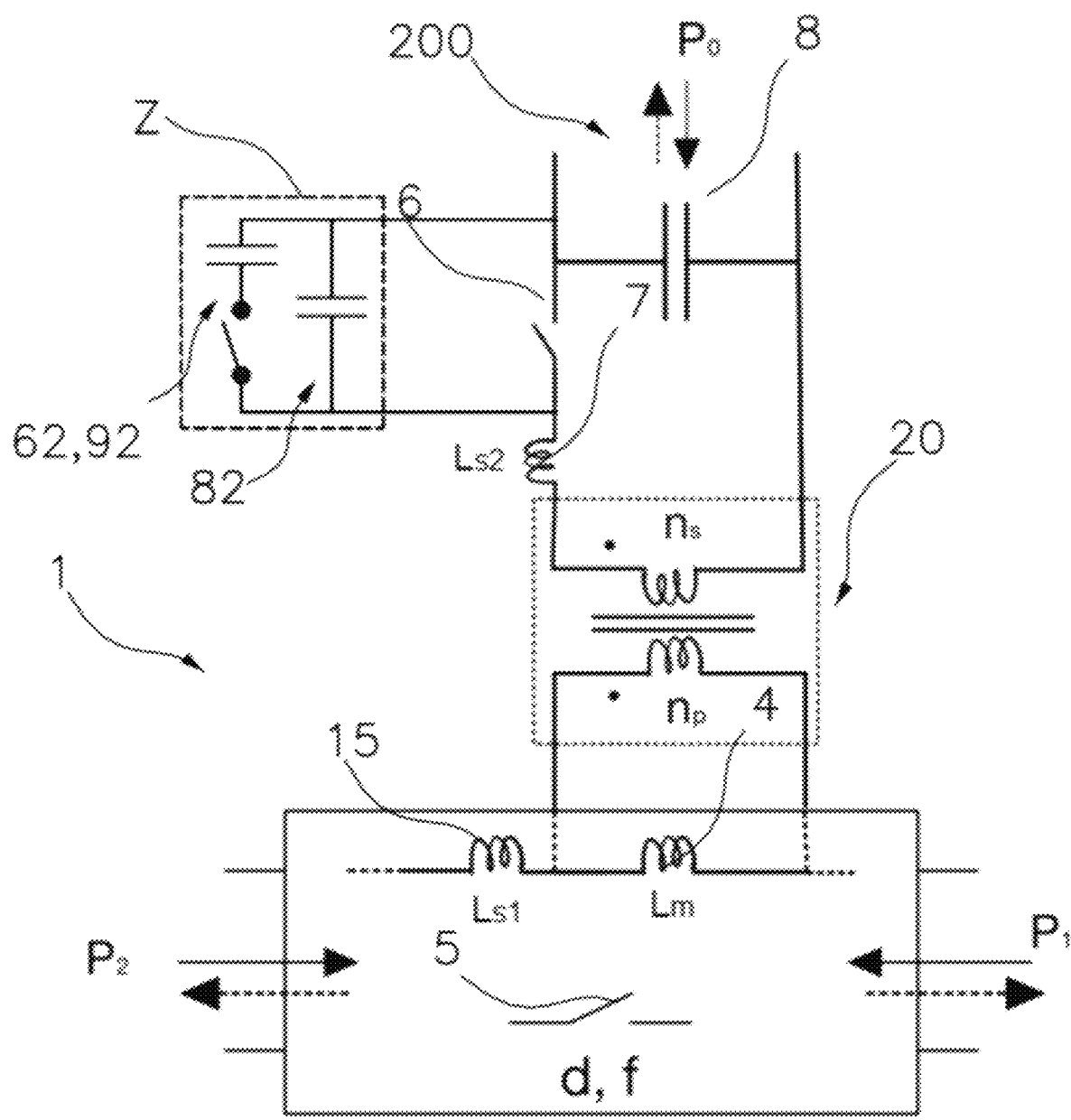
FIG. 6A illustrates the previous embodiment with the addition of an ideal transformer 20. The circuit operates as with a real transformer 20 embedding inductances $L_m$, $L_{s1}$ and $L_{s2}$, as illustrated in FIG. 6B.
Figure 6B:
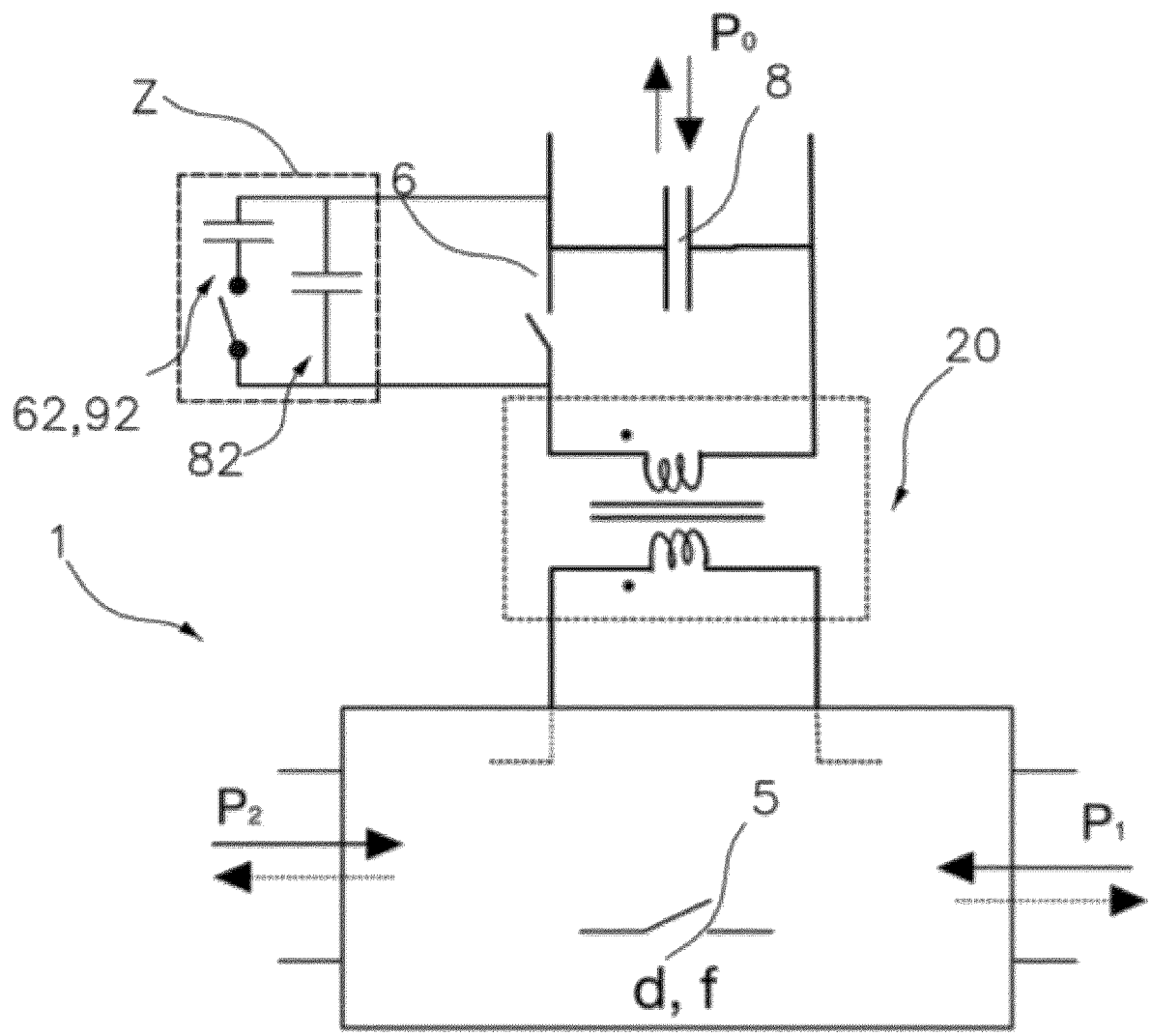

As illustrates FIG. 5 the switched mode power converter also operates properly adding the inductance Ls1, as described by the waveforms of FIG. 14 and adapting the calculation of the switching frequency f to regulate the voltage in the additional port 200 as described in equation.

$$f = \frac{V_0 \cdot d'}{2 \cdot P_o \cdot L_{s2}} \cdot (V^- + V_0) \cdot (1 - d).$$

Moreover, adding the inductance $L_{s1}$, does not significantly change circuit operation. A Thevenin equivalent may be derived to calculate the relationship between the switching frequency f and the output voltage in the additional port 200, $v_0$. This means that the voltage level in the transformer is slightly different, and also the output impedance of the equivalent circuit that drives the inductance $L_{s2}$. The advantage of adding $L_{s1}$ is that, together with $L_m$, and $L_{s2}$, its combined functionality may be also achieved by a single transformer. The magnetizing inductance performs as $L_m$, and the leakage inductances perform as $L_{s1}$ and $L_{s2}$. This embodiment extends the functionality of claim 1 in the sense of providing both isolation and voltage and current transformation, provided by the transformer turns ratio.

Figure 7A:
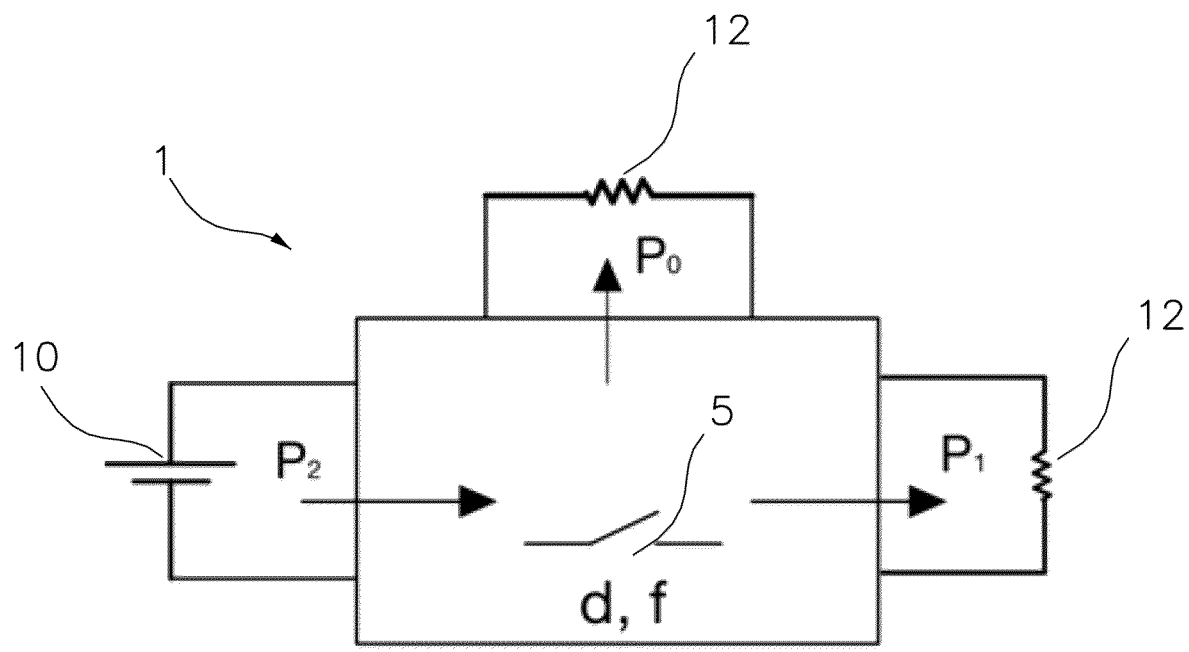
FIGS. 7A to 7C illustrate different configurations of the switched mode power converter according to this invention arranged to supply two different loads, independently regulated by the duty cycle and by the switching frequency.
Figure 7B:
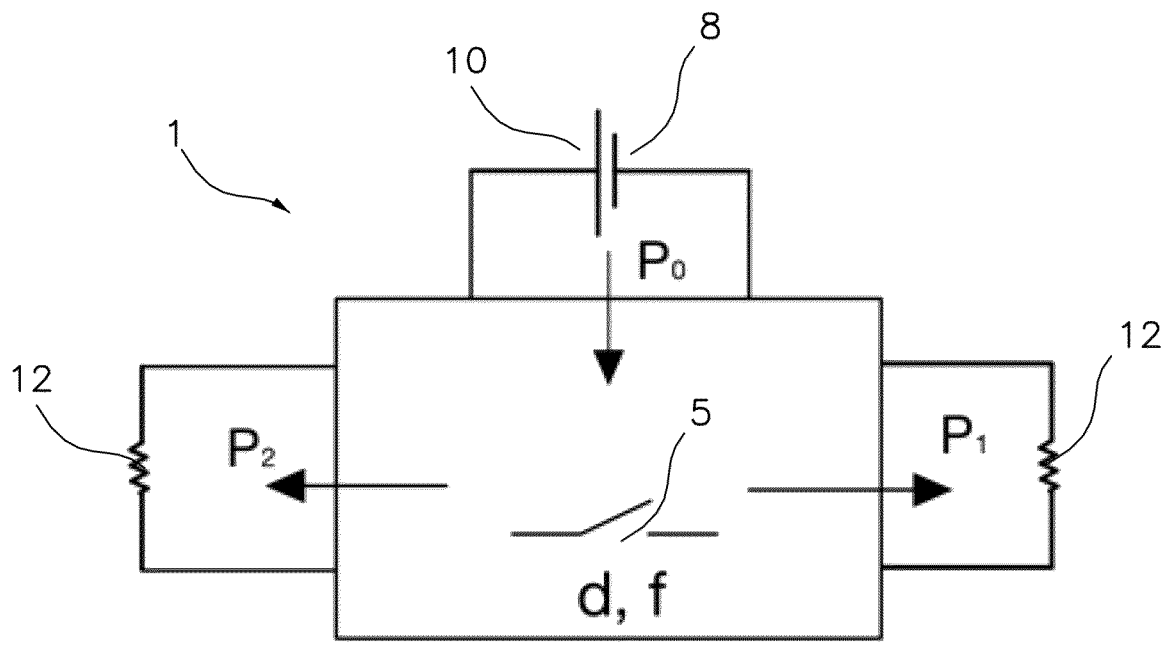
Figure 7C:
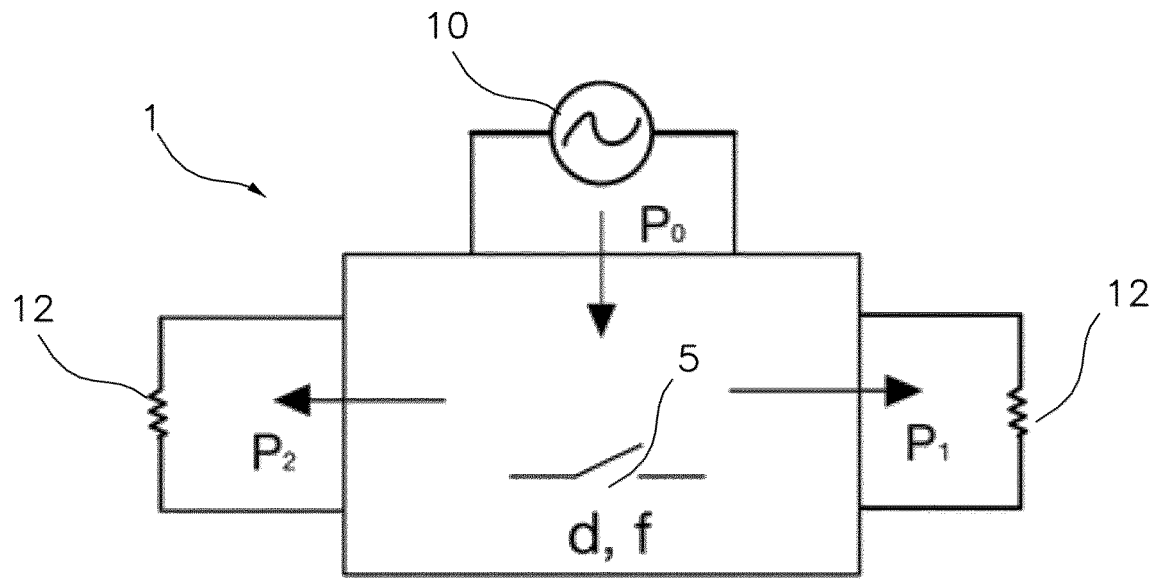

The embodiments of FIGS. 7A to 7C illustrate that the invention may be configured to supply two different loads, independently regulated by the duty cycle d and the switching frequency f, supplied from the same energy source, which may be connected to any port of the converter. The energy source may be either DC voltage or a low frequency AC voltage with regard to the switching frequency f.

Figure 8:
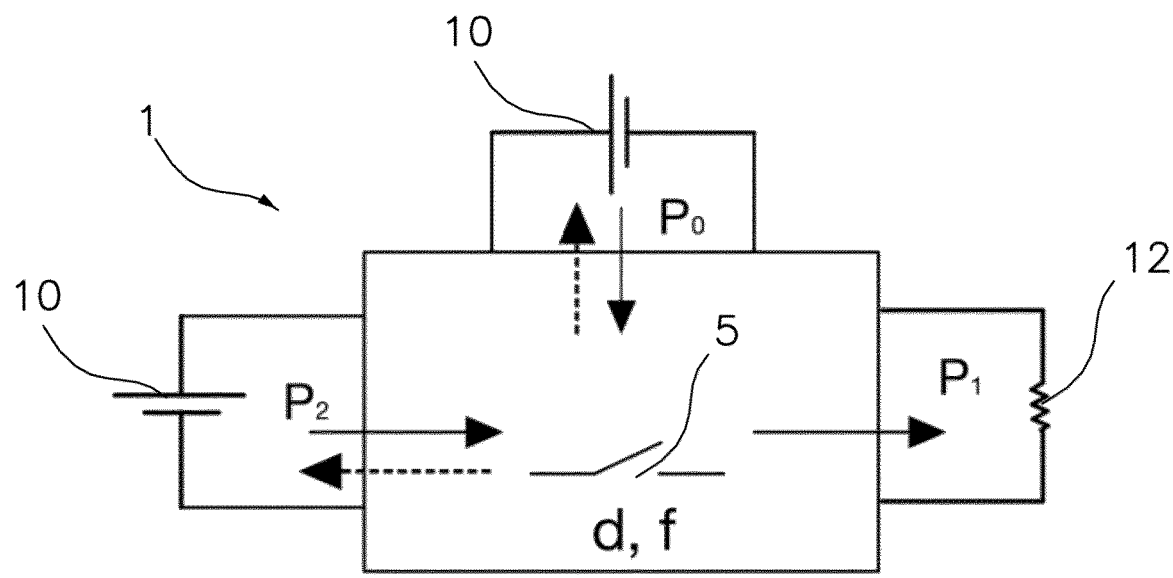
FIG. 8 shows an embodiment of the switched mode power converter according to this invention configured to supply one single load, which receives energy from two different energy sources. The power supplied by these two sources is controlled by the duty cycle (d) of the power switches and by the switching frequency (f) of the power converter.
Figure 9A:
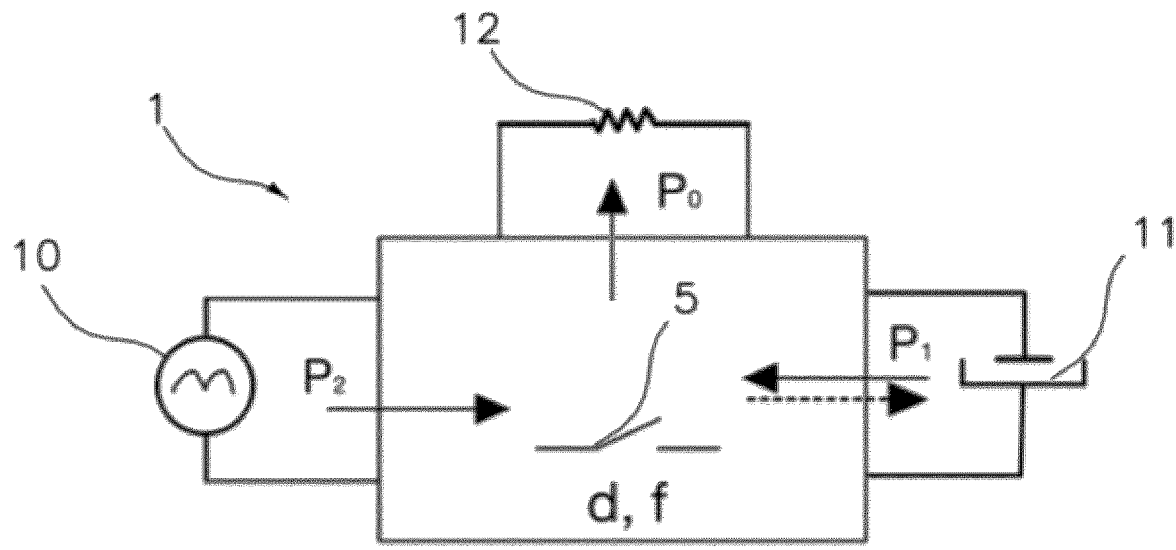
FIGS. 9A to 9E disclose some embodiments illustrating that the switched mode power converter of this invention may be configured to include an energy buffer.
Figure 9B:
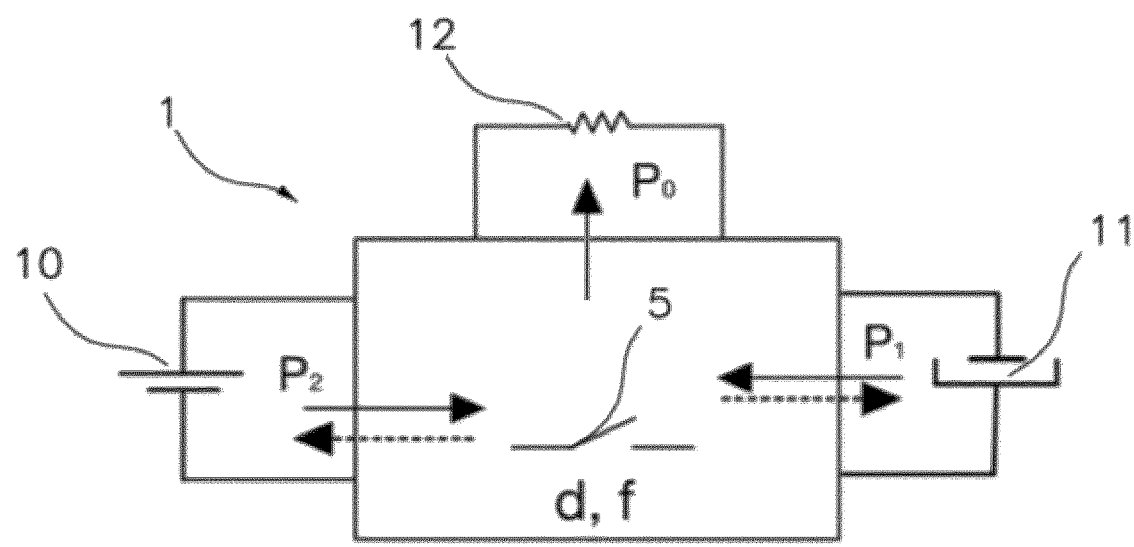
Figure 9C:
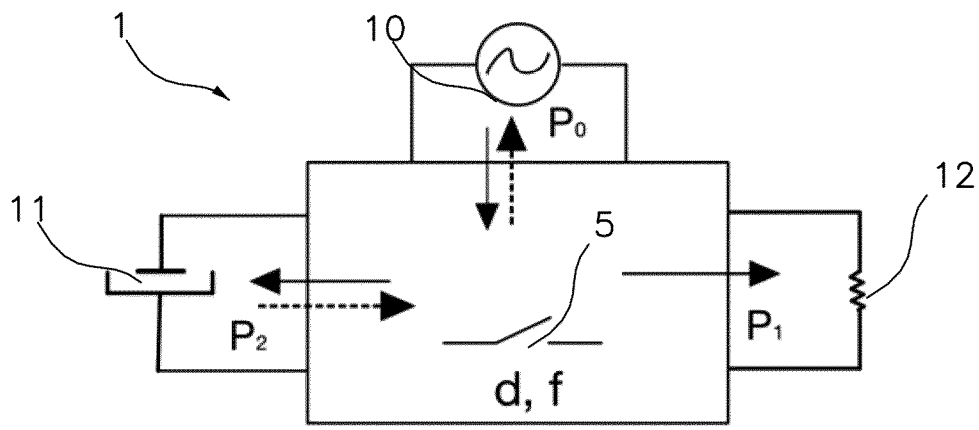
Figure 9D:
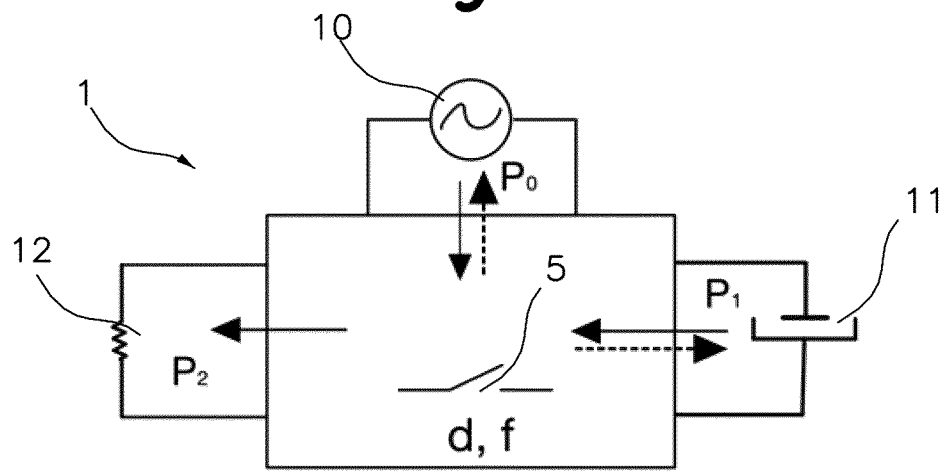
Figure 9E:
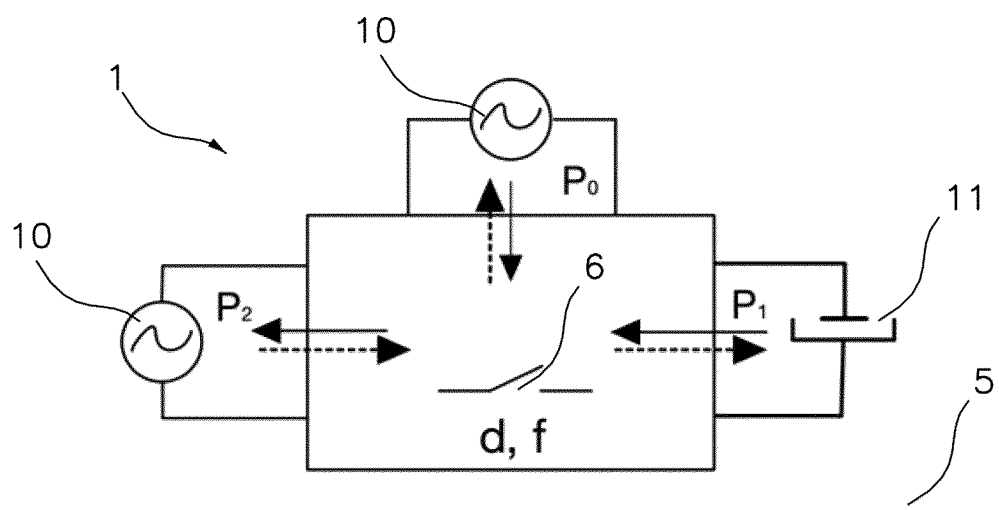

FIG. 8 illustrates an embodiment evidencing that the switched mode power converter may be configured to supply one single load, which receives energy from two different energy sources. The energy source may be either DC voltage or a low frequency AC voltage with regard to the switching frequency f. The amount of power delivered by each energy source may be independently regulated by the duty cycle d and the switching frequency f.

The embodiments detailed in FIGS. 9A to 9E illustrate that the invention may be configured to include an energy buffer. The energy source, the energy buffer and the load may be connected to any port. The energy source may be either DC voltage or a low frequency AC voltage with regard to the switching frequency f. The amount of power delivered to the load and its voltage are regulated by either the duty cycle d or the switching frequency f. The not selected control variable may be used to shape or condition the current provided by the energy source. An additional control loop may be added to adjust the amplitude of the input current by controlling the mean voltage in the port used as energy storage.

Figure 10:
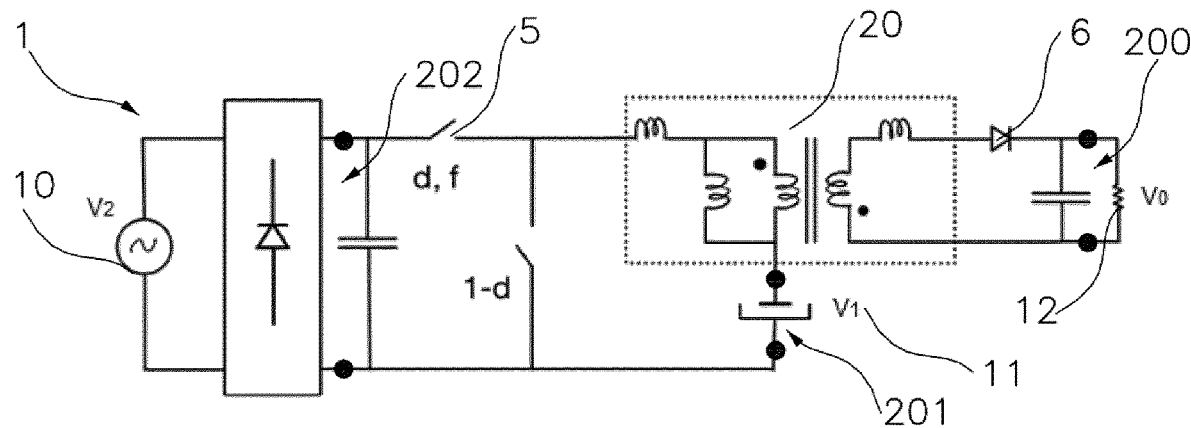
FIG. 10 shows an embodiment of the switched mode power converter of this invention based on a synchronous buck converter to regulate the voltage gain and the power flow between port 202 and port 201 and whereas the DC port 201 is connected to an energy buffer, which may absorb or deliver power at a frequency orders of magnitude lower than the switching frequency of the power converter.
Figure 11A:
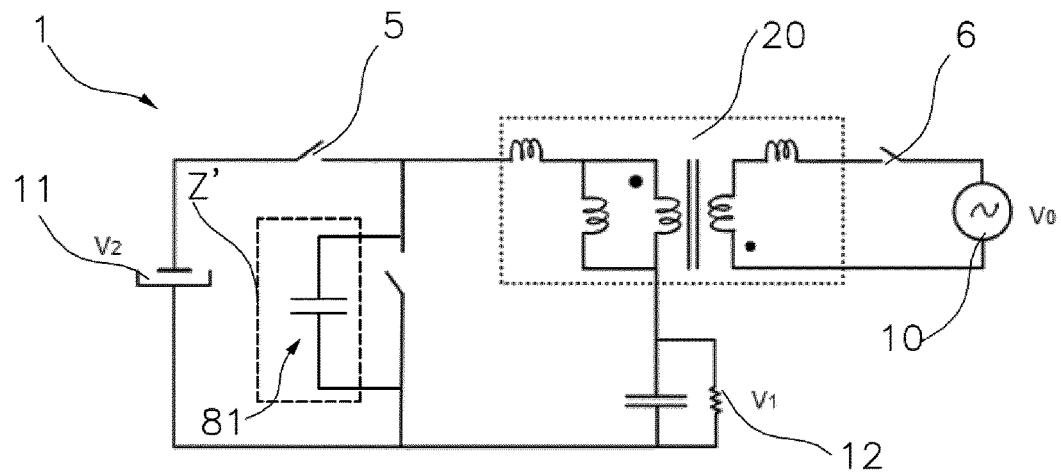
FIGS. 11A and 11B show two embodiments of the switched mode power converter of this invention in which an AC energy source is connected to port 200.
Figure 11B:
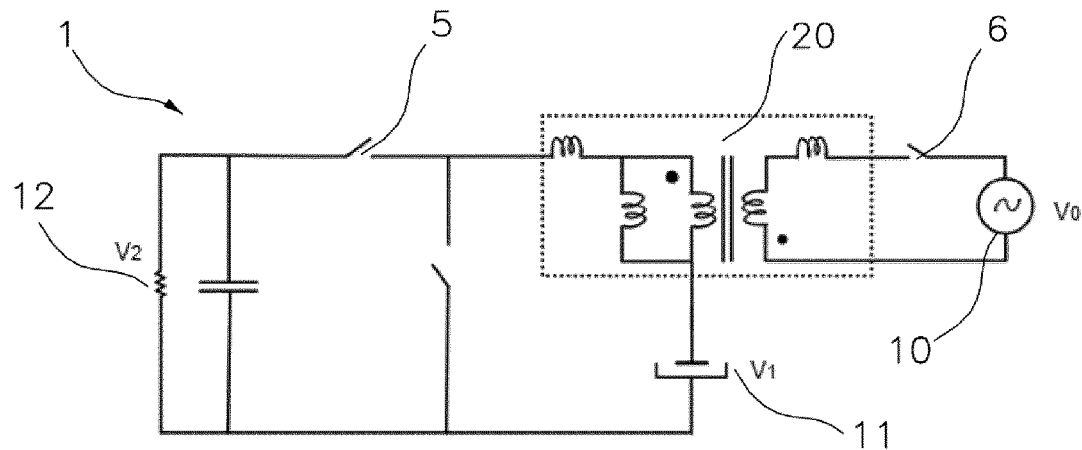

The embodiments of FIGS. 10, 11A and 11B refers to a configuration based on a synchronous buck converter to regulate the voltage gain and the power flow between port 202 and port 201. The magnetizing inductance of the transformer is also the inductance of the buck converter and operates in continuous conduction mode (CCM). The duty cycle d may be controlled so that the shape of the input power provided by the AC energy source rectified and connected to port 202 produces a high-power factor whereas it also regulates the mean DC voltage at the energy storage port (Port 201). The switching frequency f of the power converter may regulate the output voltage applied to the load in the additional port 200. The additional port 200 includes a diode as a power switch, which may be replaced by a synchronous controlled transistor to reduce losses and increase efficiency.

Figure 12:
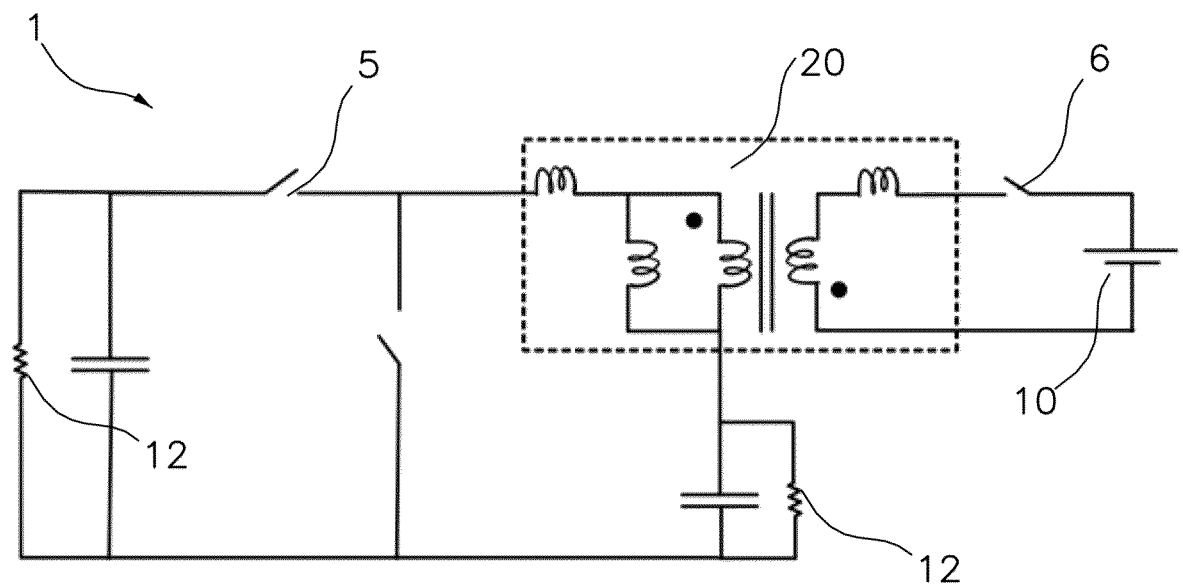
FIG. 12 shows an embodiment of the switched mode power converter of this invention, where a synchronous buck converter regulates the voltage gain and the power flow between port 202 and port 201 and a DC energy source is connected to port 200.

In the embodiment of FIG. 12 a synchronous buck converter regulates the voltage gain and the power flow between port 202 and port 201. The magnetizing inductance of the transformer is also the inductance of the buck converter and operates in continuous conduction mode (CCM). Two different loads are connected to these two ports 202 and 201, indistinctively. The duty cycle d of the power converter regulates the voltage gain and power flow between these two ports. The switching frequency f may be controlled to regulate the voltage gain between these two ports 202 and 201 and a DC voltage connected to the additional port 200. The additional port may include either a uni-directional or a bi-directional power switch, depending on the power flow.

Figure 13:
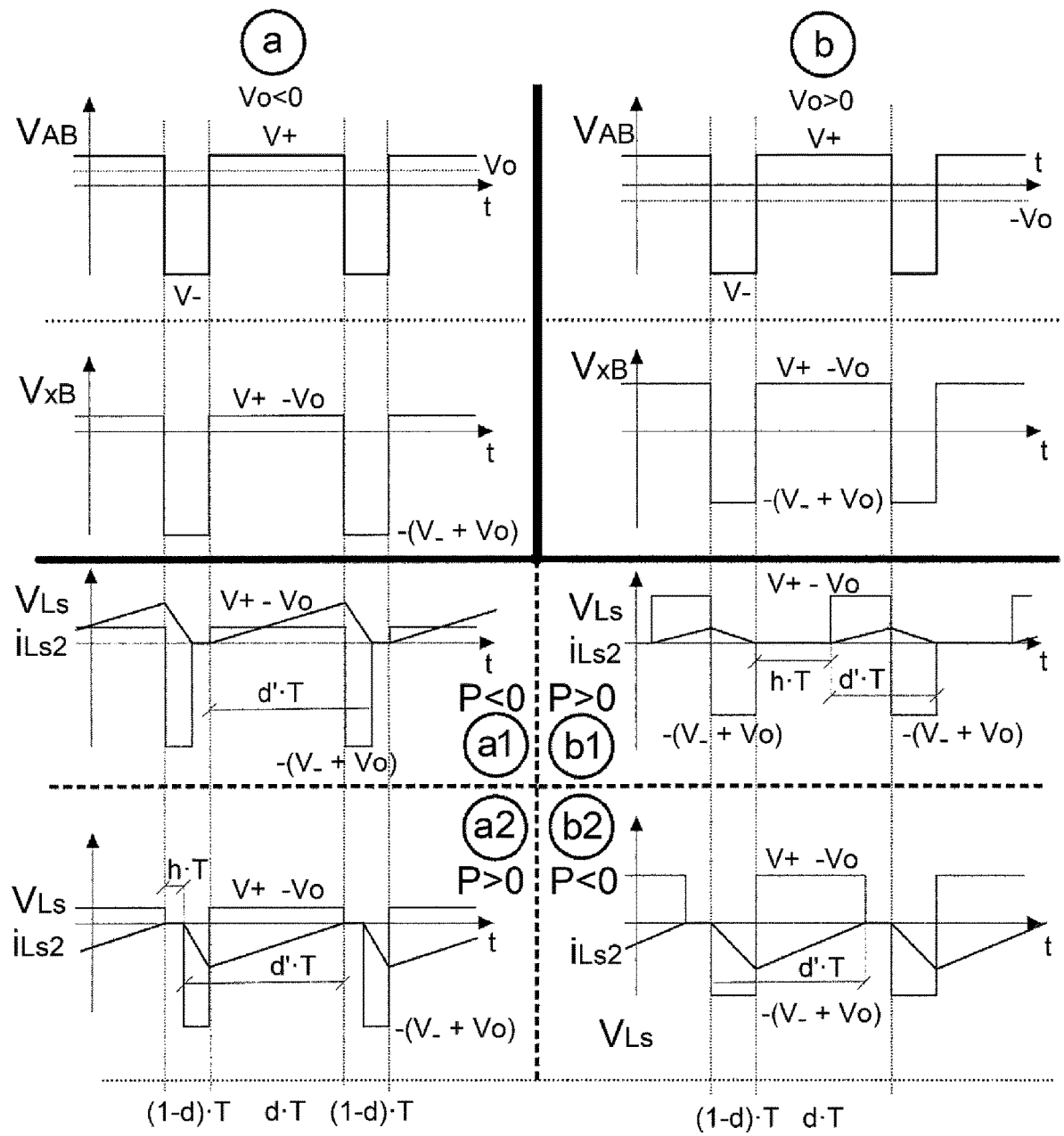
In FIG. 13 the key waveforms describing the operation of the switched mode power converter of this invention have been represented. The additional port 200 may operate in any of the 4 quadrants with regard to voltage and power (a1, a2, b1, b2).
Figure 14A:
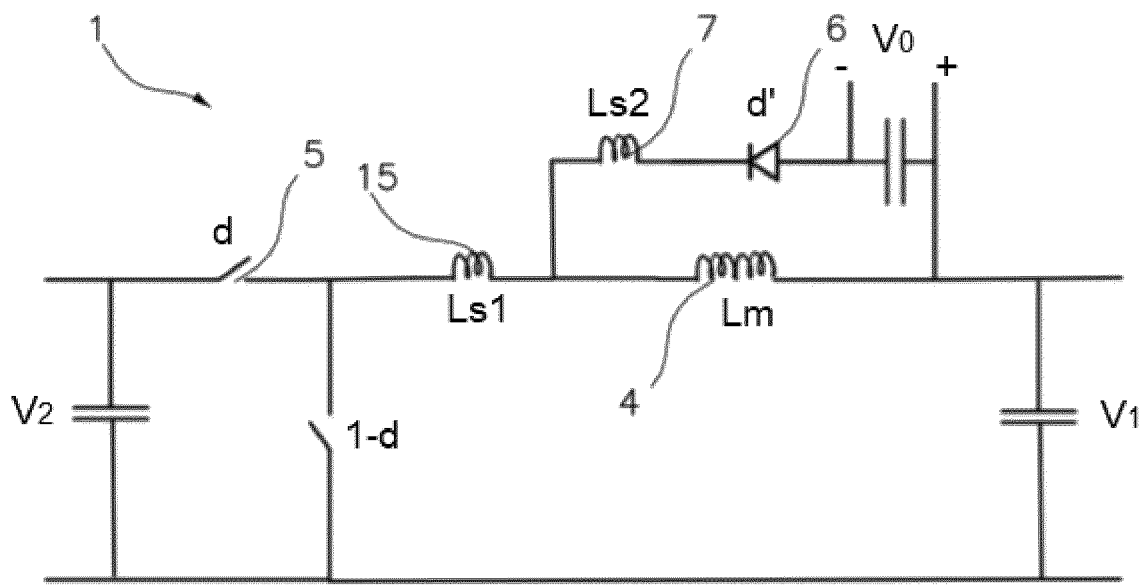
FIG. 14A shows a specific embodiment of this invention, wherein the power converter 1 is a synchronous buck, and the power switch in the additional port is a diode. This converter is also the equivalent circuit of the embodiment corresponding to claim 8, shown in FIG. 10.
Figure 14B:
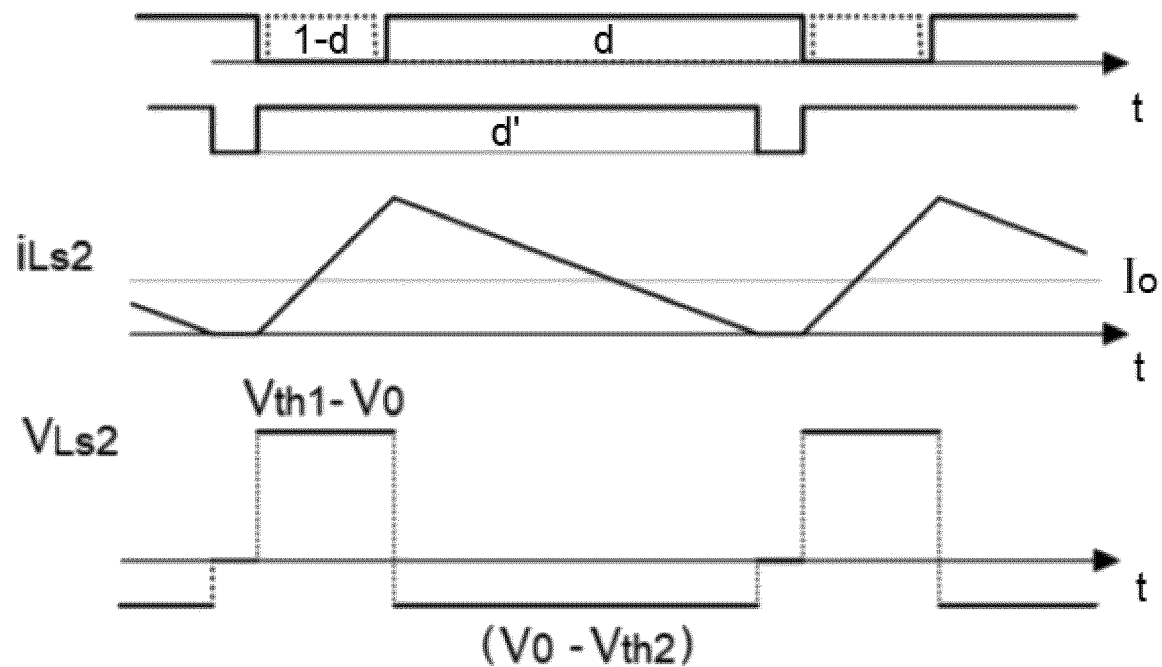
FIG. 14B to 14F illustrate the conduction timing of the three power switches together with the voltage $V_{Ls2}$ that drives the current in the inductance Ls2.
Figure 14C:
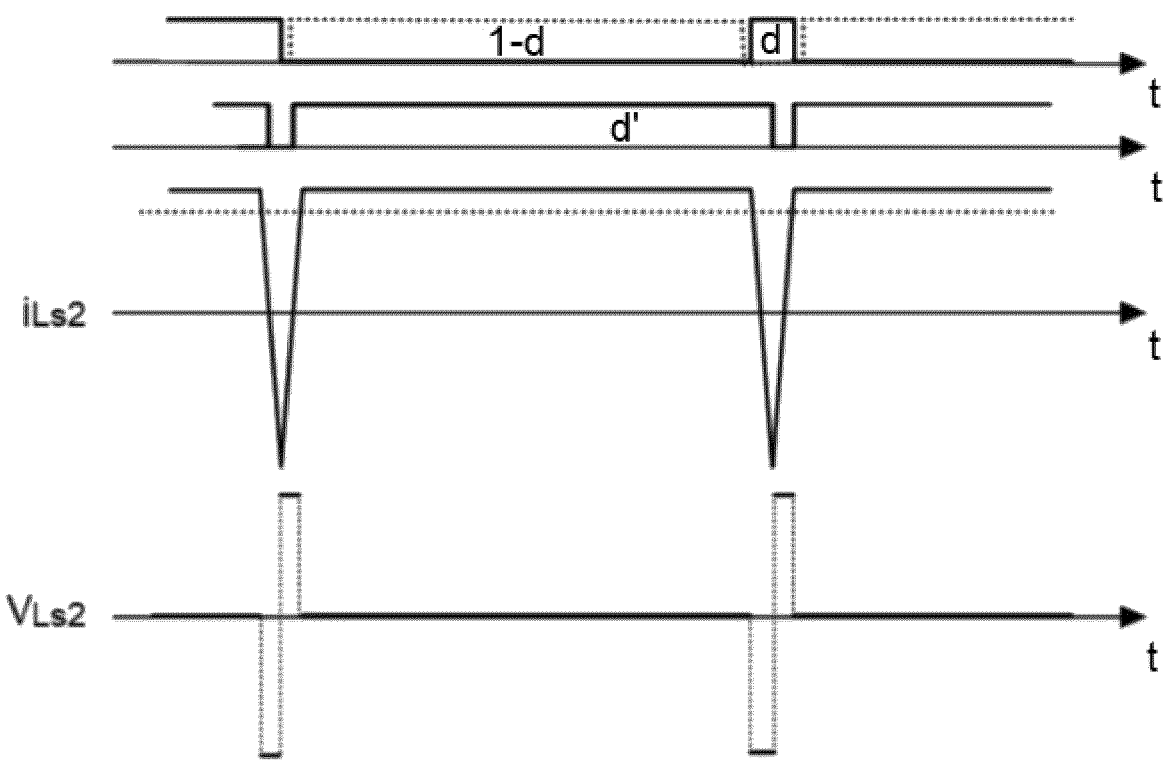
Figure 14D:
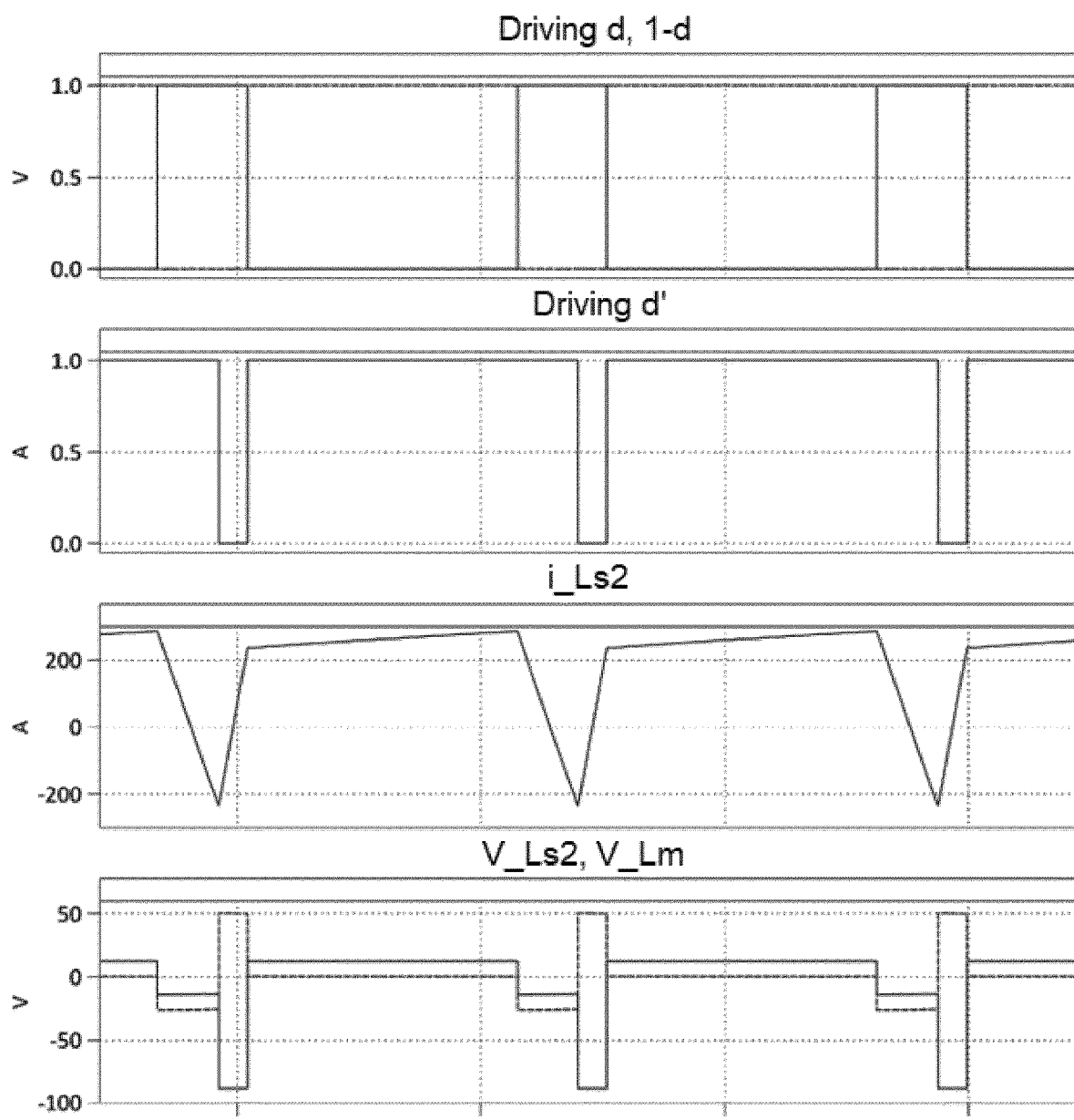
Figure 14E:
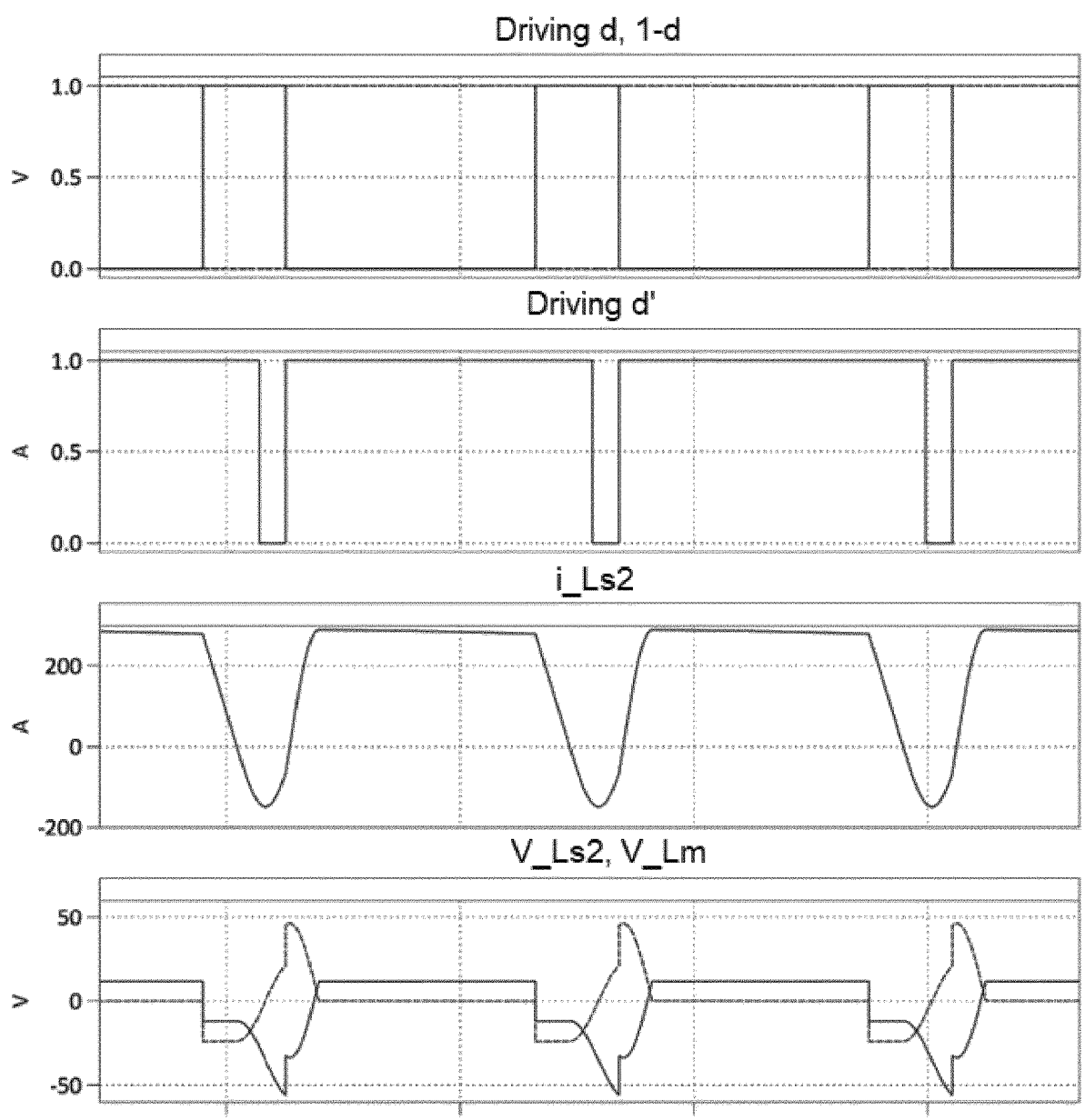
Figure 14F:
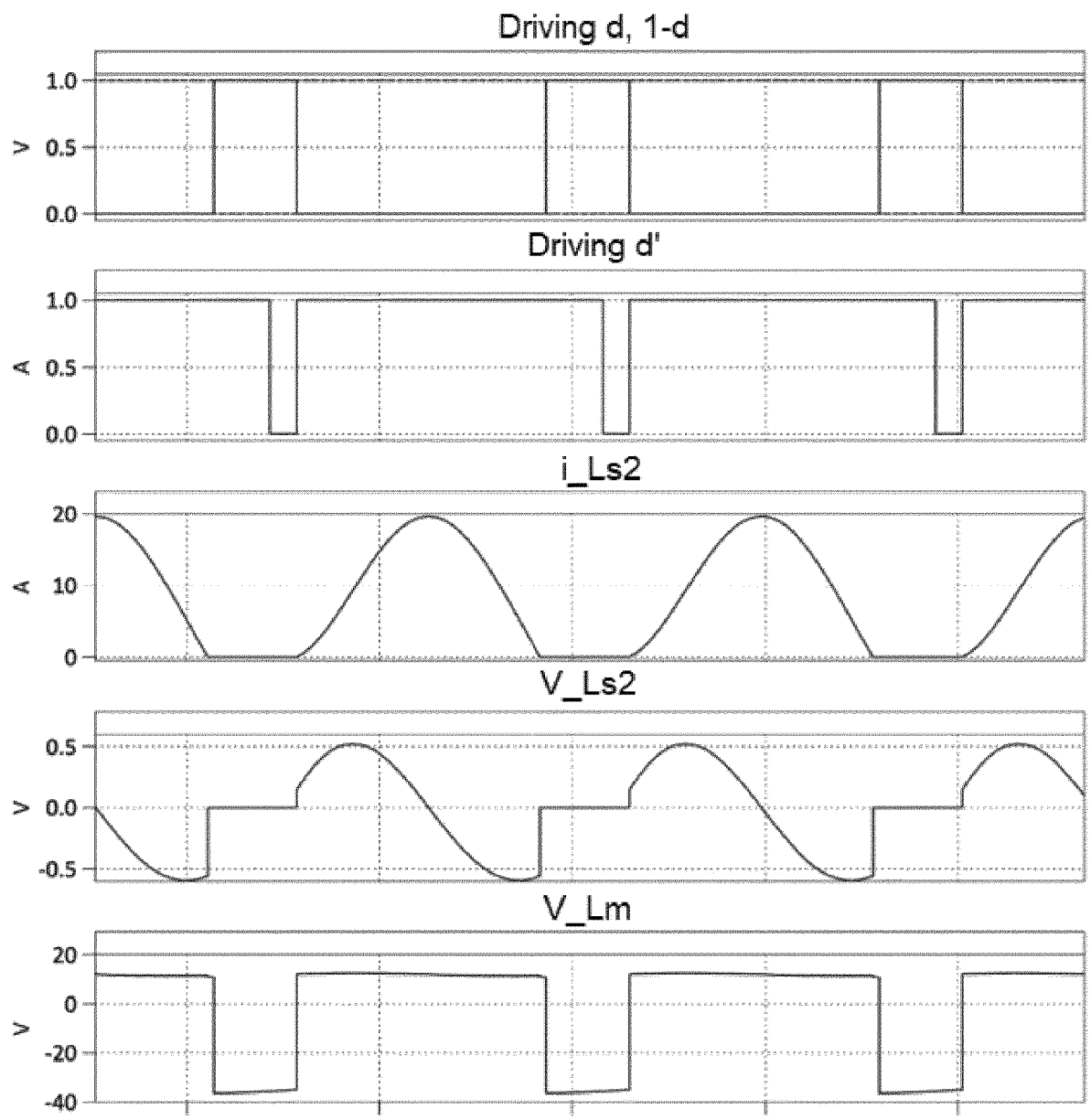

The key waveforms describing the operation of the switched mode power converter of this invention have been represented in FIG. 13.

Voltage $V_{AB}$ represents the voltage waveform applied to the inductance $L_m$. This voltage alternates at least between a positive $V^+$ and negative $V^-$ level, although it might include other voltage levels, including zero. The average voltage of this inductance, as in any other inductance operating in a steady state in a power converter, is zero. An example in case of a buck converter is $V^+=V_{in}-V_s$ and $V^-=V_s$ being $V_{in}$ the input voltage and $V_s$ the output voltage of the power converter.

Any output voltage $V_s$ may be obtained between these two voltage levels, positive $V^+$ and negative $V^-$.

Voltage $V_{xB}$ is the voltage in the inductance minus the output voltage, that is $V_{xB}=V_{AB}+V_o$. It represents the voltage available to drive the additional inductance $L_{s2}$.

Four operation modes $a_1$, $a_2$, $b_1$, $b_2$ at switching frequency, may be implemented, according to:
Whether the voltage in the additional port, $V_o$, is positive ($b_1$, $b_2$) or negative ($a_1$, $a_2$),
Whether the power in the additional port, $P_o$ is positive ($b_1$, $a_2$) or negative ($a_1$, $b_2$)

Let "$S_d$" be the main power switch of the power converter 1. d is its duty cycle, and dT refers to the time this switch is conducting in each switching cycle, and therefore producing a positive voltage between the nodes A and B, that is $V_{AB}>0$ The inductance $L_{s2}$ operates in Discontinuous Conduction Mode (DCM), and is driven as described below, in each of the four operation modes:

Mode $a_1$ ($V_o<0$ and $P_o<0$): The port behaves as a load because the power is negative (flowing out of the power converter). The current $i_{Ls2}$ in the inductance $L_{s2}$ increases, since the voltage applied is $V^+-V_0$, starting at zero, in synchronism with dT. At the time that Sa is turned OFF, the voltage applied to the inductance is negative $-(V^-+V_0)$ and the current decreases linearly to zero, remaining at this level until the next switching cycle, when $S_d$ is turned ON again.

$$f = \frac{V_0 \cdot d'}{2 \cdot P_o \cdot L_{s2}} \cdot (V^+ - V_0) \cdot d$$

Mode $a_2$ ($V_o<0$ and $P_o>0$): For the port to operate as an energy source (power flowing into the power converter), a delay fraction of time, hT, is required with regard to the time at which $S_d$ turns OFF. The current $i_{Ls2}$ in the inductance $L_{s2}$ decreases as the voltage applied is $-(V^-+V_0)$, starting at zero in synchronism with (1−d)T plus the delay time hT. At the time that $S_d$ is turned ON, the voltage applied to the inductance is positive, $V^+-V_0$ and the current increases linearly to zero, remaining at this level until the next switching cycle. Note that h=1−d'

$$f = \frac{V_0 \cdot d'}{2 \cdot P_o \cdot L_{s2}} \cdot (V^- + V_0) \cdot (1 - d - h)$$

Mode $b_1$ ($V_o>0$ and $P_o>0$): For the port to operate as an energy source (power flowing into the power converter), a delay fraction of time, hT, is required with regard to the time at which $S_d$ turns ON. The current $i_{Ls2}$ in the inductance $L_{s2}$ increases as the voltage applied is $V^+-V_0$, starting at zero in synchronism with dT plus the delay time hT. At the time that $S_d$ is turned OFF, the voltage applied to the inductance is negative, $-(V^-+V_0)$ and the current decreases linearly to zero, remaining at this level until the next switching cycle. Note that h=1−d'

$$f = \frac{V_0 \cdot d'}{2 \cdot P_o \cdot L_{s2}} \cdot (V^+ - V_0) \cdot (d - h)$$

Mode $b_2$ ($V_o>0$ and $P_o<0$): The port behaves as a load because the power is negative (flowing out of the power converter). The current $i_{Ls2}$ in the inductance $L_{s2}$ decreases as the voltage applied is $-(V^-+V_0)$, starting at zero, in synchronism with (1−d)T. At the time that $S_d$ is turned ON, the voltage applied to the inductance is positive, $V^+-V_0$ and the current increases linearly to zero, remaining at this level until the next switching cycle, when $S_d$ is turned OFF again.

$$f = \frac{V_0 \cdot d'}{2 \cdot P_o \cdot L_{s2}} \cdot (V^- + V_0) \cdot (1-d)$$

The switching frequency is the control parameter of this additional port, which may be calculated as a function of $L_{s2}$ and all the operation conditions as illustrated in the formulae. These expressions for the frequency are derived calculating the average current flowing through the inductance, and relating this value with the output power, just multiplying by the load resistance.

In FIG. 14 a particular embodiment of the invention has been considered, being the power converter 1 a synchronous buck, and the power switch in the additional port is a diode. This power converter is also the equivalent circuit of the embodiment shown in FIG. 10.

The illustrated waveforms correspond to the operation mode $b_2$.

It can be seen that the waveforms are the same as those depicted in FIG. 13, being:

$$V^+ = V_{Th1} = \frac{V_1}{n} \cdot \frac{L_M}{L_M \cdot L_{s1}}$$

$$V^- = V_{Th2} = \frac{(V_1 - V_2)}{n} \cdot \frac{L_M}{L_M \cdot L_{s1}}$$

$$L_{Th} = \frac{L_M \cdot L_{s1}}{L_M + L_{s1}}$$

$$L_{eq} = L_{Th} + L_{s2}$$

$$d = \frac{V_1}{V_2}$$

The invention claimed is:

1. A PWM electrical switched-mode power converter, comprising: a first power switch; two DC ports, each one being configured to flow power uni-directionally or bi-directionally and each one being controlled by a duty cycle d of the first power switch; a first inductance L, configured to perform power transfer in the PWM electrical switched-mode power converter, the first inductance L, having a square voltage waveform that is configured to alternate between positive V+ and negative V− values at a switching frequency f of the PWM electrical switched-mode power converter, and a mean value that is zero in steady state; an additional DC port, connected to the first inductance L, in parallel, and comprising a series connection of: a controlled second power switch; a second inductance $L_{s2}$ configured to control a mean value of its current $i_{Ls2}$; and an output capacitor, wherein: the second inductance $L_{s2}$ is configured to operate in Discontinuous Conduction Mode (DCM) driven according to four operation modes as described in the following equations:

mode $a_1$ for $V_o$<0 and $P_o$<0:

$$f = \frac{V_0 \cdot d'}{2 \cdot P_0 \cdot L_{s2}} \cdot (V^+ - V_0) \cdot d,$$

where the current $i_{Ls2}$ in the second inductance $L_{s2}$ increases, since a voltage applied is V+−Vo, starting at zero, in synchronism with dT, and at a time the first power switch is turned OFF, a voltage applied to the second inductance $L_{s2}$ is negative −(V−+Vo) and the current decreases linearly to zero, remaining at this level until the next switching cycle, when the first power switch is turned ON again; mode $a_2$ for $V_o$<0 and $P_o$>0:

$$f = \frac{V_0 \cdot d'}{2 \cdot P_0 \cdot L_{s2}} \cdot (V^- - V_0) \cdot (1-d-h),$$

a delay fraction of time hT being required when first power switch turns OFF, the current $i_{Ls2}$ in the second inductance Ls decreases as a voltage applied is −(V−+Vo), starting at zero in synchronism with (1−d)T plus a delay fraction of time hT, and when the first power switch is turned ON, a voltage applied to the second inductance $L_{s2}$ is positive, V+−Vo and the current increases linearly to zero, remaining at this level until the next switching cycle; mode $b_1$ for $V_o$>0 and $P_o$>0:

$$f = \frac{V_0 \cdot d'}{2 \cdot P_0 \cdot L_{s2}} \cdot (V^+ - V_0) \cdot (d-h),$$

a delay fraction of time hT being required with regard to a time at which the first power switch turns ON, the current $i_{Ls2}$ in the second inductance $L_{s2}$ increases as the voltage applied is V+−Vo, starting at zero in synchronism with dT plus the delay time hT, and when first power switch is turned OFF, a voltage applied to the second inductance $L_{s2}$ is negative, −(V−+V) and the current decreases linearly to zero, remaining at this level until the next switching cycle; mode $b_2$ for $V_o$>0 and $P_o$<0:

$$f = \frac{V_0 \cdot d'}{2 \cdot P_0 \cdot L_{s2}} \cdot (V^- - V_0) \cdot (1-d),$$

the current $i_{Ls2}$ in the second inductance $L_{s2}$ decreases as a voltage applied is −(V−+Vo), starting at zero, in synchronism with (1−d)T, and when first power switch is turned ON, the voltage applied to the second inductance $L_{s2}$ is positive, V+−Vo and the current increases linearly to zero, remaining at this level until the next switching cycle, when the first power switch is turned OFF again, where: Vo is an output voltage of the additional DC port; $P_0$ is a power of the additional DC port; T is the period of the switching frequency f; d' is a duty cycle of the second power switch, dt refers to the time this switch is conducting in each switching cycle and h=1−d'.

2. The PWM electrical switched-mode power converter according to claim 1, wherein at least one of a capacitance, a clamping capacitance and a clamping switch are connected in parallel with power terminals of the controlled second power switch; a conduction time of the controlled second power switch being maximized to reduce a RMS value of the current $i_{Ls2}$, the conduction time being adjusted to operate the controlled second power switch close to its technological limit, that is, its maximum breakdown voltage.

3. The PWM electrical switched-mode power converter according to claim 1, further comprising a third inductance $L_{s1}$.

4. The PWM electrical switched-mode power converter according to claim 3, wherein the additional DC port further comprises a transformer configured to provide isolation to the additional port; magnetizing and leakage inductances of the transformer being configured to at least partially or completely replace the first inductance $L_m$, the second inductance $L_{s2}$ and the third inductance $L_{s1}$.

5. The PWM electrical switched-mode power converter according to claim 1, wherein a first of the two DC ports or the additional DC port is connected to an energy source, the energy source being a DC voltage or a low frequency AC voltage with regard to the switching frequency f of the PWM electrical switched-mode power converter; a load being connected to each of a second of the two DC ports and the additional DC port and their voltages being independently controlled by the duty cycle d and the switching frequency f of the PWM electrical switched-mode power converter.

6. The PWM electrical switched-mode power converter according to claim 1, wherein a first of the two DC ports is connected to a first energy source and the additional DC port is connected to a second energy source, the first and second energy sources being either a DC voltage or a low frequency AC voltage with regard to the switching frequency f, and a load being connected to a second of the two DC ports, the load being configured to receive power from the first and second energy sources, the power being independently controlled by the duty cycle d and the switching frequency f of the PWM electrical switched-mode power converter.

7. The PWM electrical switched-mode power converter according to claim 1, wherein a first of the two DC ports is connected to an energy source, the energy source being a DC voltage or a low frequency AC voltage with regard to the switching frequency f, a second of the two DC ports is configured to be used as energy storage providing a two-port energy buffered power converter storing energy changes at a rate controlled either by a selected duty cycle d or by a selected switching frequency f of the PWM electrical switched-mode power converter, and the additional DC port is connected to a load, a voltage of the load being regulated by a non-selected duty cycle d or by a non-selected switching frequency f of the PWM electrical switched-mode power converter.

8. The PWM electrical switched-mode power converter according to claim 7, wherein the duty cycle d and the switching frequency f are configured to control a DC voltage of the load, and to shape an input current in an AC or rectified AC voltage, whereby reducing a harmonic content of the input current.

9. The PWM electrical switched-mode power converter according to claim 1, which is based on a synchronous buck converter, wherein a first of the two DC ports is connected to an AC voltage through a rectifier bridge, and the additional DC port is connected to a load; the duty cycle d being configured to control a shape of an input current, and an amplitude of the input current being adjusted by regulating a mean voltage of a second of the two DC ports, which is connected to an energy storage; a voltage applied to the load being regulated by the switching frequency f.

10. The PWM electrical switched-mode power converter according to claim 1, which is based on a synchronous buck converter, wherein the additional DC port is connected to an AC voltage, a first of the two DC ports is configured to be used as an energy storage, and a second of the two DC ports is connected to a load, the controlled second power switch being bi-directional, the switching frequency f being configured to control a shape of an input current, an amplitude of the input current being adjusted by regulating a mean voltage of the first of the two DC ports used as energy storage, and a voltage applied to the load being regulated by the duty cycle d.

11. The PWM electrical switched-mode power converter according to claim 1, wherein at least one of a capacitance and a clamping capacitance, and a clamping switch are connected with the power terminals of the first power switch in parallel.

12. The PWM electrical switched-mode power converter according to claim 1, wherein an output capacitance of any of the two DC ports comprises a magnitude configured to produce a voltage resonance added to its mean voltage that produces a resonance in the current in the second inductance $L_{s2}$.

13. A method to operate a PWM electrical switched-mode power converter, the PWM electrical switched-mode power converter comprising: a first power switch; two DC ports, in which power in one of the two DC ports is configured to flow uni-directionally or bi-directionally, controlled by a duty cycle d of the first power switch; a first inductance $L_m$; an additional DC port, which is connected in parallel to the first inductance $L_m$, and comprises a series connection of a controlled second power switch, a second inductance $L_{s2}$, and an output capacitor, power transfer in the electrical switched-mode power converter being performed by the first inductance $L_m$, the first inductance L, having a square voltage waveform that is configured to alternate between positive V+ and negative V− values at a switching frequency f of the PWM electrical switched-mode power converter and a mean value that is zero in steady state, the second inductance $L_{s2}$ being operated to control a mean value of its current $i_{Ls2}$, wherein the second inductance $L_{s2}$ is configured to operate in Discontinuous Conduction Mode (DCM) driven according to four operation modes as described in the following equations:

mode $a_1$ for $V_o<0$ and $P_o<0$:

$$f = \frac{V_0 \cdot d'}{2 \cdot P_0 \cdot L_{s2}} \cdot (V^+ - V_0) \cdot d,$$

where the current $i_{Ls2}$ in the second inductance $L_{s2}$ increases, since a voltage applied is V+−Vo, starting at zero, in synchronism with dT, and when the first power switch is turned OFF, a voltage applied to the second inductance $L_{s2}$ is negative −(V−+Vo) and the current iLs2 decreases linearly to zero, remaining at this level until the next switching cycle, when the first power switch is turned ON again;

mode $a_2$ for $V_o<0$ and $P_o>0$;

$$f = \frac{V_0 \cdot d'}{2 \cdot P_0 \cdot L_{s2}} \cdot (V^- - V_0) \cdot (1 - d - h),$$

a delay fraction of time hT being required with regard to a time at which the first power switch turns OFF, the current $i_{Ls2}$ in the second inductance $L_{s2}$ decreases as a voltage applied is −(V−+Vo), starting at zero in synchronism with (1−d)T plus a delay fraction of time hT, and at a time that the first power switch is turned ON, a voltage applied to the second inductance $L_{s2}$ is positive, V+−Vo and the current increases linearly to zero, remaining at this level until the next switching cycle;

mode $b_1$ for $V_o>0$ and $P_o>0$:

$$f = \frac{V_0 \cdot d'}{2 \cdot P_0 \cdot L_{s2}} \cdot (V^+ - V_0) \cdot (d - h),$$

a delay fraction of time hT being required with regard to a time at which the first power switch turns ON, the current $i_{Ls2}$ in the second inductance $L_{s2}$ increases as the voltage applied is $V^+ - Vo$, starting at zero in synchronism with dT plus the delay time hT, and when the first power switch is turned OFF, a voltage applied to the second inductance $L_{s2}$ is negative, $-(V^- + Vo)$ and the current $i_{Ls2}$ decreases linearly to zero, remaining at this level until the next switching cycle;

mode $b_2$ for $V_o > 0$ and $P_o < 0$;

$$f = \frac{V_0 \cdot d'}{2 \cdot P_0 \cdot L_{s2}} \cdot (V^- - V_0) \cdot (1 - d),$$

the current $i_{Ls2}$ in the second inductance $L_{s2}$ decreases as a voltage applied is $-(V^- + Vo)$, starting at zero, in synchronism with $(1-d)T$, and at a time that first power switch is turned ON, the voltage applied to the second inductance $L_{s2}$ is positive, $V^+ - Vo$ and the current $i_{Ls2}$ increases linearly to zero, remaining at this level until the next switching cycle, when the first power switch is turned OFF again, where: Vo is an output voltage of the additional DC port; $P_0$ is a power of the additional DC port; T is the period of the switching frequency f; d' is a duty cycle of the second power switch, dt refers to the time this switch is conducting in each switching cycle and $h = 1 - d'$.

14. The method according to claim 13, wherein a first of the two DC ports is connected to an energy source, the energy source being a low frequency AC voltage with regard to the switching frequency f, a second of the two DC ports is configured to be used as energy storage providing a two-port energy buffered power converter storing energy changes at a rate controlled either by a selected duty cycle d or by a selected switching frequency f of the PWM electrical switched-mode power converter, and the additional DC port is connected to a load, a voltage of the load being regulated by a non-selected duty cycle d or by a non-selected switching frequency f of the PWM electrical switched-mode power converter, the duty cycle d and the switching frequency f controlling a DC voltage of the load and shaping an input current, the method further comprising controlling the switching frequency f and duty cycle d to provide a power flow according to three operative power pathways:

when an AC input voltage is higher than a given threshold, the power flows to the additional DC port that is connected to the load and the second of the two DC ports that is used as energy storage from the first of the two DC ports connected to the energy source;

when the input power is lower than the power demanded by the load, the power flows to the additional DC port that is connected to the load from the first of the two DC ports connected to the energy source and the second of the two DC ports used as energy storage; and when the AC input voltage is lower than a given threshold, the power flows to the additional DC port that is connected to the load from the second of the two DC ports that is used as energy storage.

15. The method according to claim 14, further comprising adjusting a mean voltage of the second of the two DC ports that is used as energy storage using an RMS or peak voltage of the first of the two DC ports connected to the energy source, hence reducing power losses and improving performance of the PWM electrical switched-mode power converter.

* * * * *